United States Patent [19]

Fukui et al.

[11] Patent Number: 5,178,995
[45] Date of Patent: Jan. 12, 1993

[54] OPTICAL INFORMATION RECORDING MEDIUM

[75] Inventors: Tetsuro Fukui, Kawasaki; Yoshhiro Oguchi, Yokohama; Kyo Miura, Sagamihara; Yoshio Takasu, Tokyo, all of Japan

[73] Assignee: Canon Kabushiki Kaisha, Tokyo, Japan

[21] Appl. No.: 679,144

[22] Filed: Mar. 28, 1991

Related U.S. Application Data

[63] Continuation of Ser. No. 405,580, Sep. 8, 1989, abandoned, which is a continuation of Ser. No. 97,162, Sep. 16, 1987, abandoned.

[30] Foreign Application Priority Data

Sep. 18, 1986 [JP] Japan ................. 61-221136
Dec. 27, 1986 [JP] Japan ................. 61-309073
Dec. 27, 1986 [JP] Japan ................. 61-309074
Dec. 30, 1986 [JP] Japan ................. 61-311331

[51] Int. Cl.$^5$ ............................................. G11B 7/24
[52] U.S. Cl. .................................. 430/495; 430/945; 430/270; 346/135.1
[58] Field of Search ............ 430/270, 945, 495; 346/135.1

[56] References Cited

U.S. PATENT DOCUMENTS

| | | | |
|---|---|---|---|
| 4,626,496 | 12/1986 | Sato ................................. | 430/270 |
| 4,652,514 | 3/1987 | Abe et al. ........................ | 430/495 |
| 4,656,121 | 4/1987 | Sato et al. ....................... | 430/495 |
| 4,707,430 | 11/1987 | Ozawa et al. .................... | 430/495 |
| 4,714,667 | 12/1987 | Sato et al. ....................... | 430/270 |
| 4,735,889 | 4/1988 | Namba et al. ................... | 430/495 |
| 4,738,908 | 4/1988 | Oguchi et al. ................... | 430/270 |
| 4,767,693 | 8/1988 | Oba et al. ........................ | 430/495 |
| 4,891,305 | 1/1990 | Oba et al. ........................ | 430/495 |

*Primary Examiner*—Charles L. Bowers, Jr.
*Assistant Examiner*—Martin Angebranndt
*Attorney, Agent, or Firm*—Fitzpatrick, Cella, Harper & Scinto

[57] ABSTRACT

An optical information recording medium comprises at least one compound, selected from the compounds of the general formulae (1-I) to (3-III) shown and pyrylium compounds, and a metal chelate compounds in the recording medium.

6 Claims, No Drawings

OPTICAL INFORMATION RECORDING MEDIUM

This application is a continuation of application Ser. No. 405,580, filed Sep. 8, 1989, now abandoned, which is a continuation of application Ser. No. 097,162, filed Sep. 16, 1987, now abandoned.

BACKGROUND OF THE INVENTION

1. Field of the Invention

This invention relates to an optical information recording medium suitable for optical writing recording by laser, etc., more particularly to an improved optical information recording medium which can be used for optical disc and optical card.

2. Related Background Art

Generally speaking, an optical disc or optical card can memory a high density information with an optically detectable small, for example, about $1\mu$ pit formed on a thin recording layer provided on a substrate being in the track form of a spiral, circular or linear shape. For writing information in such disc or card, converged laser is scanned on the surface of a laser sensitive layer, whereby only the surface irradiated with the laser beam forms pits, which pits are formed in the form of spiral, circular or linear tracks. The laser sensitive layer can form optically detectable pits through absorption of laser energy. For example, according to the heat mode recording system, the laser sensitive layer absorbs heat energy, and can form a small concavity (pit) at that site through vaporization or melting. Also, according to another heat mode recording system, through absorption of the laser energy irradiated, a pit having an optically detectable density difference can be formed at that site.

The information recorded on such optical disc and optical card is detected by scanning laser beam along the track and reading the optical change at the portion where a pit is formed and the portion where no pit is formed. For example, in the case of an optical disc or optical card, laser beam is scanned along the track, and the energy reflected by the disc or the card is monitored by a photodetector. At the portion where a pit is formed, reflection of laser becomes lower and the output from the photodetector becomes smaller. On the other hand, at the portion where no pit is formed, reflection is sufficiently effected to make the output from the photodetector greater.

As an optical information recording medium to be used for such optical disc and optical card, there have been hitherto proposed those using primarily inorganic materials, for example, a metal thin film such as aluminum, gold vapor deposited film, etc., bismuth thin film, tellurium oxide thin film, chalcogenide type amorphous glass film, etc. These thin films have drawbacks such that storability is poor, decomposition ability is low, recording density is low, the cost is high, etc.

Also, it has been recently proposed to use an organic dye thin film which can undergo change in physical properties with a light of relatively longer wavelength for the recording layer. The organic dye thin film can remove the above drawbacks, but an organic dye having absorption characteristic on the longer wavelength side will generally involve a problem in that stability is low to heat and light. Including these points, the organic coloring matter to be used in recording material is required to have the following properties, namely:

1. to have no toxicity;
2. to have an absorption at around 800 nm, with a great coefficient of absorption;
3. to have good solubility in an organic solvent;
4. to have a great reflectance at around 800 nm in a thin film state;
5. to be crystallized with difficulty in a thin film state;
6. to be stable to UV-ray and visible light;
7. to be thermally stable;
8. to be stable to humidity;
9. to be synthesized with ease, etc.

The advantages of organic dye as compared with inorganic compounds which have been used in the prior art may include no toxicity of item 1. and good solubility of item 3., but there is the problem that it is readily crystallized in a thin film state, while having sufficient reflectance.

Reflectance is necessary for scanning of laser on the track with good precision when monitored with a photodetector, but absorbance, reflectance of the organic film will be lowered to great extent if crystallization occurs, whereby pit can be formed with difficulty to make recording impossible.

SUMMARY OF THE INVENTION

The present invention has been accomplished in view of the state of the art as described above, and its principal object is to provide an optical information recording medium containing a pyrylium compound, having high reflectance and good storage stability.

More specifically, the present invention provides an optical information recording medium, comprising a recording medium containing a specific organic coloring matter and at least one metal chelate compound.

According to the present invention, there is provided an optical information recording medium, comprising at least one compound, selected from the compounds of the general formulae (1-I) to (3-III) and pyrylium compounds, and a metal chelate compound in the recording medium.

DETAILED DESCRIPTION OF THE PREFERRED EMBODIMENTS

The organic coloring matter compound used in the optical information recording medium of this invention may include the following.

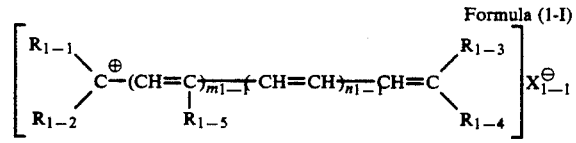

Formula (1-I)

$R_{1-1}$, $R_{1-2}$, $R_{1-3}$, $R_{1-4}$ and $R_{1-5}$ each represent hydrogen atom or an alkyl group (e.g. methyl, ethyl, n-propyl, isopropyl, n-butyl, sec-butyl, isobutyl, t-butyl, n-amyl, t-amyl, n-hexyl, n-octyl, t-octyl, etc.), and further include other alkyl groups such as substituted alkyl groups (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfate propyl, 4-sulfate butyl, N-(methylsulfonyl)carbamylmethyl, 3-(acetylsulfamyl)propyl, 4-(acetylsulfamyl)butyl, etc.), cyclic alkyl groups (e.g. cyclohexyl, etc.), alkenyl groups (e.g. vinyl, allyl, propenyl, butenyl, pentenyl, hexenyl, heptenyl, octenyl, dodecynyl, prenyl, etc.), aralkyl groups (e.g. benzyl, phenethyl, α-naphthylmethyl, β-naphthylmethyl, etc.), substituted aralkyl groups (e.g. carboxybenzyl, sulfobenzyl, hydroxybenzyl, etc.). Further, $R_{1-1}$, $R_{1-2}$, $R_{1-3}$, $R_{1-4}$ and $R_{1-5}$ each represent a substituted or unsubstituted aryl group (e.g. phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, etc.), a substituted or unsubstituted heterocyclic group (e.g. pyridyl, quinolyl, lepidyl, methylpyridyl, furyl, thienyl, an indolyl, pyrrole, carbazolyl, an N-ethylcarbazolyl, etc.) or a substituted or unsubstituted styryl group (e.g. styryl, methoxystyryl, dimethoxystyryl, trimethoxystyryl, ethoxystyryl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diethylaminophenyl)-2-phenylvinyl, 2-(dibenzylaminophenyl)-2-phenylvinyl, 2,2-di(diethylaminophenyl)vinyl, 2,2-di(methoxyphenyl)vinyl, 2,2-di(ethoxyphenyl)vinyl, 2-(dimethylaminophenyl)-2-methylvinyl, 2-(diethylaminophenyl)-2-ethylvinyl, etc.). $m_{1-1}$ is 0 or 1 and $n_{1-1}$ is 0, 1 or 2. $X_{1-1}\ominus$ represents an anion such as chloride, bromide, iodide, perchlorate, benzenesulfonate, p-toluenesulfonate, methylsulfate, ethylsulfate, propylsulfate, tetrafluoroborate, tetraphenylborate, hexafluorophosphate, benzenesulfinate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethanesulfonate, hexafluoroantimonate, molybdate, tungstate, titanate, zirconate and so on.

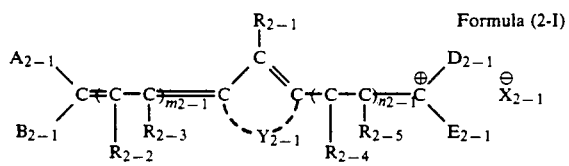

Formula (2-I)

(wherein $A_{2-1}$, $B_{2-1}$, $D_{2-1}$ and $E_{2-1}$ each represent hydrogen atom, an alkyl, an alkenyl, a substituted or unsubstituted aralkyl and a substituted or unsubstituted aryl group; $Y_{2-1}$ represents a divalent residue having a group of atoms necessary for the completion of a 5-membered or 6-membered ring; $R_{2-1}$, $R_{2-2}$, $R_{2-3}$, $R_{2-4}$ and $R_{2-5}$ represent hydrogen atom, a halogen atom or an alkyl; $X_{2-1}\ominus$ represents an anion; and $m_{2-1}$ and $n_{2-1}$ represent 0, 1 or 2.)

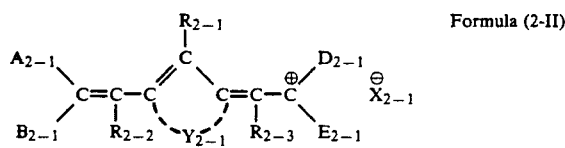

Formula (2-II)

(wherein $A_{2-1}$, $B_{2-1}$, $D_{2-1}$ and $E_{2-1}$ each represent hydrogen atom, an alkyl, an alkenyl, a substituted or unsubstituted aralkyl and a substituted or unsubstituted aryl group; $Y_{2-1}$ represents a divalent residue having a group of atoms necessary for the completion of a 5-membered or 6-membered ring; $R_{2-1}$, $R_{2-2}$ and $R_{2-3}$ each represent hydrogen atom, a halogen atom or an alkyl; and $X_{2-1}\ominus$ represents an anion.)

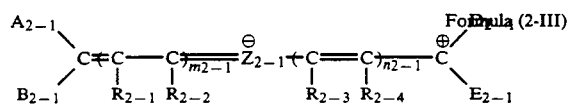

Formula (2-III)

(wherein $Z_{2-1}\ominus$ represents

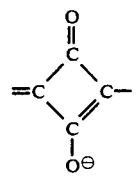

or

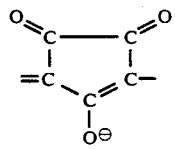

$A_{2-1}$, $B_{2-1}$, $D_{2-1}$ and $E_{2-1}$ each represent hydrogen atom, an alkyl, an alkenyl, a substituted or unsubstituted aralkyl and substituted or unsubstituted aryl; $R_{2-1}$, $R_{2-2}$, $R_{2-3}$ and $R_{2-4}$ represent hydrogen atom, halogen atom or an alkyl; and $m_{2-1}$ and $n_{2-1}$ represent 0, 1 or 2.)

In the above Formulae (2-I), (2-II) and (2-III), $A_{2-1}$, $B_{2-1}$, $D_{2-1}$ and $E_{2-1}$ each represent hydrogen atom, a substituted or unsubstituted alkyl, an alkenyl, a substituted or unsubstituted aralkyl and substituted or unsubstituted aryl group (phenyl, tolyl, xylyl, ethylphenyl, chlorophenyl, dichlorophenyl, trichlorophenyl, bromophenyl, dibromophenyl, nitrophenyl, methoxyphenyl, ethoxyphenyl, dimethylaminophenyl, diethylaminophenyl, dipropylaminophenyl, dibenzylaminophenyl, pyrrolidinophenyl, diphenylaminophenyl, etc.).

$R_{2-1}$, $R_{2-2}$, $R_{2-3}$, $R_{2-4}$ and $R_{2-5}$ each represent hydrogen atom, a halogen atom or an alkyl group. The alkyl group may include unsubstituted alkyls (e.g. methyl, ethyl, n-propyl, isopropyl, n-butyl, sec-butyl, isobutyl, t-butyl, n-amyl, t-amyl, n-hexyl, n-octyl, t-octyl, etc.), and substituted alkyls (e.g. 2-hydroxyethyl, 3-hydroxypropyl, 4-hydroxybutyl, 2-acetoxyethyl, carboxymethyl, 2-carboxyethyl, 3-carboxypropyl, etc.).

$Y_{2-1}$ represents a divalent hydrocarbon capable of forming a substituted or unsubstituted 5- or 6-membered ring (e.g. —$CH_2$—$CH_2$—, —$(CH_2)_3$—,

—CH=CH—, —$CH_2$—CHCl—$CH_2$—, etc.), and the 5-membered or 6-membered ring may be fused with benzene ring, naphthalene ring, etc.

In the formula, $Z_{2-1}\ominus$ represents

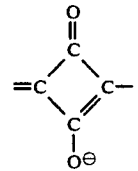

-continued or

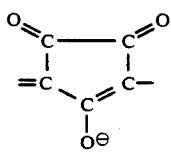

$X_{2-1}^{\ominus}$ represents an anion such as chloride, bromide, iodide, perchlorate, benzenesulfonate, p-toluenesulfonate, methylsulfate, ethylsulfate, propylsulfate, tetrafluoroborate, tetraphenylborate, hexafluorophospate, benzenesulfinate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethanesulfonate, hexafluoroantimonate, molybdate, tungstate, titanate, zirconate and so on.

$m_{2-1}$ and $n_{2-1}$ represent an integer of 0, 1 or 2.

Typical examples of the compound represented by the above formulae are mentioned below.

Among the typical examples, with respect to $Z_{2-1}^{\ominus}$,

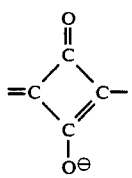

is represented by $Z_{10}$ and

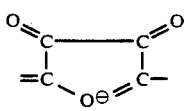

is represented by $Z_{20}$.

The arrow (←) indicates the same substituents as the left.

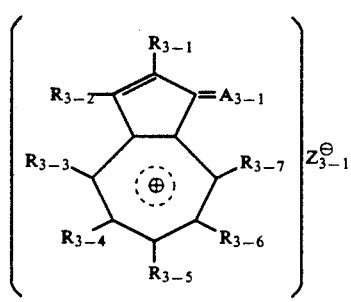

Formula (3-I)

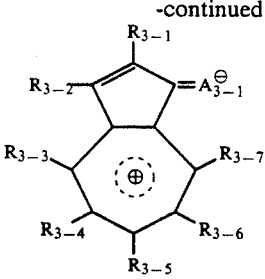

Formula (3-II)

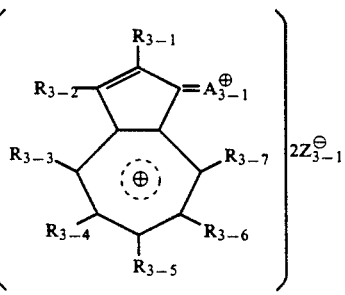

Formula (3-III)

(wherein, in general formulae (3-I), (3-II) and (3-III), $R_{3-1}$, $R_{3-2}$, $R_{3-3}$, $R_{3-4}$, $R_{3-5}$, $R_{3-6}$ and $R_{3-7}$ each represent hydrogen atom, a halogen atom or a monovalent organic residue, or a substituted or unsubstituted fused ring may be formed by at least one of the combinations of $R_{3-1}$ and $R_{3-2}$, $R_{3-2}$ and $R_{3-3}$, $R_{3-3}$ and $R_{3-4}$, $R_{3-4}$ and $R_{3-5}$, $R_{3-5}$ and $R_{3-6}$, and $R_{3-6}$ and $R_{3-7}$; $A_{3-1}$ represents a divalent organic residue; and $Z_{3-1}^{\ominus}$ represents an anion residue.)

In the general formulae, $R_{3-1}$ to $R_{3-7}$ represent hydrogen atom, halogen atom (chlorine atom, bromine atom, iodine atom) or monovalent organic residue. The monovalent organic residue, which can be widely selected, may particularly include alkyl groups (methyl, ethyl, n-propyl, isopropyl, n-butyl, t-butyl, n-amyl, n-hexyl, n-octyl, 2-ethylhexyl, t-octyl, etc.), alkoxy groups (methoxy, ethoxy, propoxy, butoxy, etc.), substituted or unsubstituted aryl groups (phenyl, tolyl, xylyl, ethylphenyl, methoxyphenyl, ethoxyphenyl, chlorophenyl, nitrophenyl, dimethylaminophenyl, α-naphthyl, β-naphthyl, etc.), substituted or unsubstituted aralkyl groups (benzyl, 2-phenylethyl, 2-phenyl-1-methylethyl, bromobenzyl, 2-bromophenylethyl, methylbenzyl, methoxybenzyl, nitrobenzyl), acyl groups (acetyl, propionyl, butyryl, valeryl, benzoyl, toluoyl, naphthoyl, phthaloyl, furoyl, etc.), substituted or unsubstituted amino groups (amino, dimethylamino, diethylamino, dipropylamino, acetylamino, benzoylamino, etc.), substituted or unsubstituted styryl groups (styryl, dimethylaminostyryl, diethylaminostyryl, dipropylaminostyryl, methoxystyryl, ethoxystyryl, methylstyryl, etc.), nitro, hydroxy, carboxyl, cyano or substituted or unsubstituted arylazo groups (phenylazo, α-naphthylazo, β-naphthylazo, dimethylaminophenylazo, chlorophenylazo, nitrophenylazo, methoxyphenylazo, tolylazo, etc.).

Further, a substituted or unsubstituted fused ring may be formed by at least one of the combinations of $R_{3-1}$ and $R_{3-2}$, $R_{3-2}$ and $R_{3-3}$, $R_{3-3}$ and $R_{3-4}$, $R_{3-4}$ and $R_{3-5}$, $R_{3-5}$ and $R_{3-6}$, and $R_{3-6}$ and $R_{3-7}$. The fuse-dring is a 5-, 6- or 7-membered, including aromatic rings (benzene, naphthalene, chlorobenzene, bromobenzene, methylbenzene, ethylbenzene, methoxybenzene, ethoxybenzene, etc.), hetero rings (furan ring, benzofuran ring, pyrrole ring, thiophene ring, pyridine ring, quinoline ring, thiazole ring, etc.), aliphatic rings (dimethylene, trimethylene, tetramethylene, etc.). $Z_{3-1}^{\ominus}$ represents an anion residue.

$A_{3-1}$ represents a divalent organic residue bonded through double bond.

Specific examples of the dye containing $A_{3-1}$ to be used in this invention may include those represented by the general formulae (3-1) to (3-11) shown below. However, in the formulae, $Q^{\oplus}$ represents the following azulenium salt nucleus, and $A_{3-1}$ is represented by the right portions, i.e. the formulae from which $Q^{\oplus}$'s are removed.

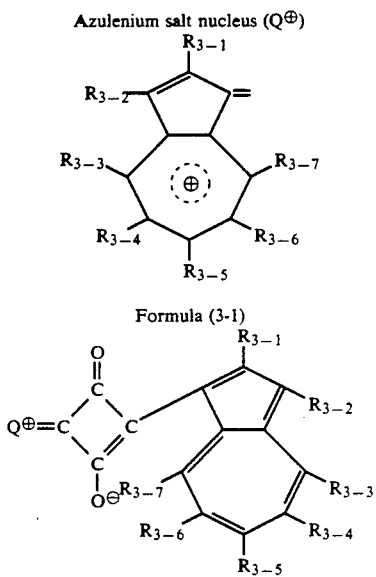

In the formula, $R_{3-1}$ to $R_{3-7}$ have the same meanings as defined above.

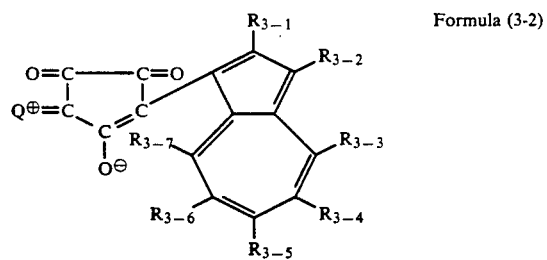

In the formula, $R_{3-1}$ to $R_{3-7}$ have the same meanings as defined above.

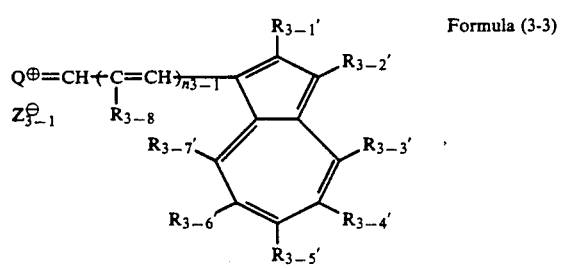

In the formula, $R'_{3-1}$ to $R'_{3-7}$ each represent hydrogen atom, a halogen atom (chlorine, bromine, iodine atom) or a monovalent organic residue. The monovalent organic residue, which can be widely selected, may particularly include alkyl groups (methyl, ethyl, n-propyl, isopropyl, n-butyl, t-butyl, n-amyl, n-hexyl, n-octyl, 2-ethylhexyl, t-octyl, etc.), alkoxy groups (methoxy, ethoxy, propoxy, butoxy, etc.), substituted or unsubstituted aryl groups (phenyl, tolyl, xylyl, ethylphenyl, methoxyphenyl, ethoxyphenyl, chlorophenyl, nitrophenyl, dimethylaminophenyl, α-naphthyl, β-naphthyl, etc.), substituted or unsubstituted aralkyl groups (benzyl, 2-phenylethyl, 2-phenyl-1-methylethyl, bromobenzyl, 2-bromophenylethyl, methylbenzyl, methoxybenzyl, nitrobenzyl), acyl groups (acetyl, propionyl, butyryl, valeryl, benzoyl, toluoyl, naphthoyl, phthaloyl, furoyl, etc.), substituted or unsubstituted amino groups (amino, dimethylamino, diethylamino, dipropylamino, acetylamino, benzoylamino, etc.), substituted or unsubstituted styryl groups (styryl, dimethylaminostyryl, diethylaminostyryl, dipropylaminostyrylmethoxystyryl, ethoxystyryl, methylstyryl, etc.), nitro, hydroxy, carboxyl, cyano or substituted or unsubstituted arylazo groups (phenylazo, α-naphthylazo, β-naphthylazo, dimethylaminophenylazo, chlorophenylazo, nitrophenylazo, methoxyphenylazo, tolylazo, etc.).

Further, a substituted or unsubstituted fused ring may be formed by at least one of the combinations of $R'_{3-1}$ and $R'_{3-2}$, $R'_{3-2}$ and $R'_{3-3}$, $R'_{3-3}$ and $R'_{3-4}$, $R'_{3-4}$ and $R'_{3-5}$, $R'_{3-5}$ and $R'_{3-6}$, and $R'_{3-6}$ and $R'_{3-7}$. The fused ring is a 5-, 6- or 7-membered, including aromatic rings (benzene, naphthalene, chlorobenzene, bromobenzene, methylbenzene, ethylbenzene, methoxybenzene, ethoxybenzene, etc.), hetero rings (furan ring, benzofuran ring, pyrrole ring, thiophene ring, pyridine ring, quinoline ring, thiazole ring, etc.), aliphatic rings (dimethylene, trimethylene, tetramethylene, etc.).

Further, the azulenium salt nucleus represented by $Q^{\oplus}$ and the azulenium salt nucleus of the right portion in the above Formula (3-3) may be symmetric or asymmetric. $Z^{\ominus}$ has the same meanings as defined above. $R_{3-8}$ represents hydrogen atom, nitro, cyano, an alkyl group (methyl, ethyl, propyl, butyl, etc.) or an aryl group (phenyl, tolyl, xylyl, etc.). $n_{3-1}$ represents an integer of 0, 1 or 2.

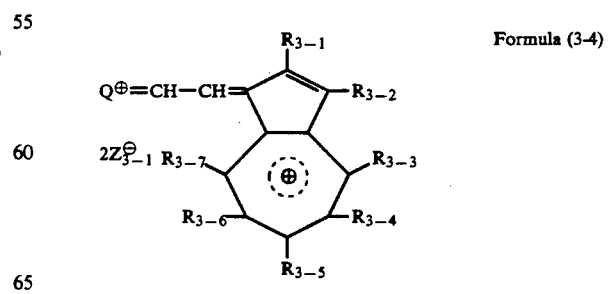

In the formula, $R_{3-1}$ to $R_{3-7}$ and $Z_{3-1}^{\ominus}$ have the same meanings as defined above.

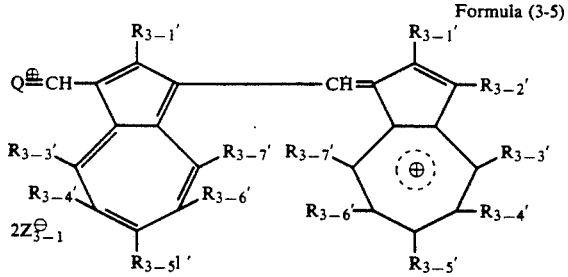

Formula (3-5)

In the formula, $R_{3-1}$ to $R_{3-7}$, $R'_{3-1}$ to $R'_{3-7}$ and $Z_{3-1}^\ominus$ have the same meanings as defined above.

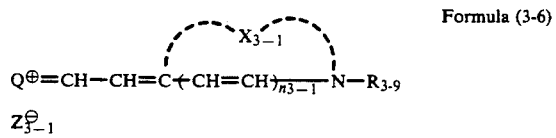

Formula (3-6)

In the formula, $X_{3-1}$ represents a group of nonmetallic atoms necessary for the completion of a nitrogen-containing hetero ring such as pyridine, thiazole, benzothiazole, naphthothiazole, oxazole, benzoxazole, naphthoxazole, imidazole, benzoimidazole, naphthoimidazole, 2-quinoline, 4-quinoline, isoquinoline or indole ring. Such hetero ring may be substituted by a halogen atom (chlorine, bromine, iodine atom), an alkyl group (methyl, ethyl, propyl, butyl, etc.), an aryl group (phenyl, tolyl, xylyl, etc.) and so on. $R_{3-9}$ represents an alkyl group (methyl, ethyl, propyl, butyl, etc.), a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl, 3-carboxypropyl, etc.), a cyclic alkyl group (cyclohexyl, cyclopropyl), an allyl group, an aralkyl group (benzyl, 2-phenylethyl, 3-phenylpropyl, 4-phenylbutyl, α-naphthylmethyl, β-naphthylmethyl), a substituted aralkyl (methylbenzyl, ethylbenzyl, dimethylbenzyl, trimethylbenzyl, chlorobenzyl, bromobenzyl, etc.), an aryl group (phenyl, tolyl, xylyl, α-naphthyl, β-naphthyl) or a substituted aryl group (chlorophenyl, dichlorophenyl, trichlorophenyl, ethylphenyl, methoxyphenyl, dimethoxyphenyl, aminophenyl, nitrophenyl, hydroxyphenyl, etc.). $m_{3-1}$ represents an integer of 0 or 1. $Z_{3-1}^\ominus$ has the same meaning as defined above.

Formula (3-7)

In the formula, $R_{3-10}$ represents a substituted or unsubstituted aryl group (phenyl, tolyl, xylyl, biphenyl, α-naphthyl, β-naphthyl, anthralyl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl, cyanophenyl, etc.). $Z_{3-1}^\ominus$ has the same meaning as defined above.

Formula (3-8)

In the formula, $R_{3-11}$ represents a monovalent heterocyclic group derived from a hetero ring such as furan, thiophene, benzofuran, thionaphthene, dibenzofuran, carbazole, phenothiazine, phenoxazine and pyridine. $Z_{3-1}^\ominus$ has the same meaning as defined above.

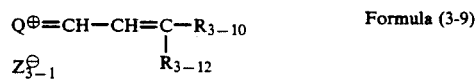

Formula (3-9)

In the formula, $R_{3-12}$ represents hydrogen atom, an alkyl group (methyl, ethyl, propyl, butyl, etc.) or a substituted or unsubstituted aryl group (phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl, pyrenyl, etc.). $R_{3-10}$ and $Z_{3-1}^\ominus$ have the same meanings as defined above.

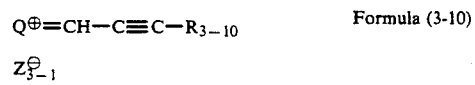

Formula (3-10)

In the formula, $R_{3-10}$ and $Z_{3-1}^\ominus$ have the same meanings as defined above.

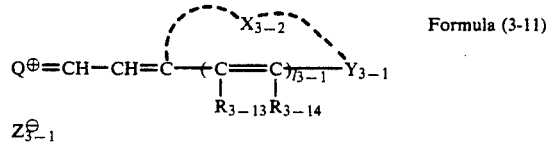

Formula (3-11)

In the formula, $X_{3-2}$ represents a group of atoms necessary for the completion of pyran, thiapyran, selenapyran, benzopyran, benzothiapyran, benzoselenapyran, naphthopyran, naphthothiapyran ornaphthoselenapyran, each of which may be substituted. $l_{3-1}$ is an integer of 0 or 1. $Y_{3-1}$ represents sulfur, oxygen or selenium atom. $R_{3-13}$ and $R_{3-14}$ each represent hydrogen atom, an alkyl group (methyl, ethyl, propyl, butyl, etc.), an alkoxy group (methoxy, ethoxy, propoxy, butoxy, etc.), a substituted or unsubstituted aryl group (phenyl, tolyl, xylyl, chlorophenyl, biphenyl, methoxyphenyl, etc.), a substituted or unsubstituted styryl group (styryl, p-methylstyryl, o-chlorostyryl, p-methoxystyryl, etc.), a substituted or unsubstituted 4-phenyl or 3-butadienyl group (4-phenyl-1,3-butadienyl, 4-(p-methylphenyl)-1,3-butadienyl, etc.) or a substituted or unsubstituted heterocyclic group (quinolyl, pyridyl, carbazolyl, furyl, etc.). $Z_{3-1}^\ominus$ is an anion residue.

Further, in the formula, the anion residue $Z_{3-1}^\ominus$ represents an anion such as chloride, bromide, iodide, perchlorate, benzenesulfonate, p-toluenesulfonate, methylsulfate, ethylsulfate, propylsulfate, tetrafluoroborate, tetraphenylborate, hexafluorophosphate, benzenesulfinate, acetate, trifluoroacetate, propione acetate, benzoate, oxalate, succinate, malonate, oleate, stearate, citrate, monohydrogen diphosphate, dihydrogen monophosphate, pentachlorostannate, chlorosulfonate, fluorosulfonateion, trifluoromethanesulfonate, hexafluoroantimonate, molybdate, tungstate, titanate, zirconate and so on.

Typical examples of the pyrylium compound are represented by the following Formula (4-I), (4-II), (4-III) or (4-IV).

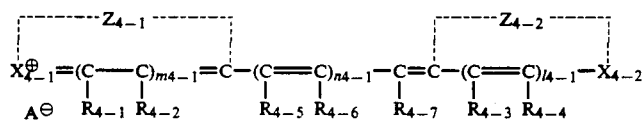

Formula (4-II)

In the formula, $X_{4-1}$ and $X_{4-2}$ each represent sulfur, oxygen, selenium or tellurium atom. $Z_{4-1}$ represents a hydrocarbon group comprising a group of atoms necessary for the completion of pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium, each of which may be substituted. $Z_{4-2}$ represents a hydrocarbon group comprising a group of atoms necessary for the completion of pyran, thiopyran, selenapyran, telluropyran, benzopyran, benzothiopyran, benzoselenapyran, benzotelluropyran, naphthopyran, naphthothiopyran, naphthoselenapyran or naphthotelluropyran, each of which may be substituted. The substituent may include halogen atoms such as chlorine, bromine and fluorine atoms; alkyl groups such as methyl, ethyl, propyl, isopropyl, butyl, t-butyl, amyl, isoamyl, hexyl, octyl, nonyl and dodecyl; alkoxy groups such as methoxy, ethoxy, propoxy, butoxy, amyloxy, hexoxy and octoxy; aryl groups such as phenyl, α-naphthyl and β-naphthyl; substituted aryl groups such as tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl and dibenzylaminophenyl.

$R_{4-1}$, $R_{4-2}$, $R_{4-3}$ and $R_{4-4}$ each represent:
(a) hydrogen atom;
(b) a substituted or unsubstituted alkyl group, particularly an alkyl group having 1 to 15 carbon atoms: for example, methyl, ethyl, propyl, isopropyl, butyl, t-butyl, amyl, isoamyl, hexyl, octyl, nonyl, dodecyl;
(c) an aryl group: phenyl, α-naphthyl, β-naphthyl;
(d) a substituted aryl group: tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, dibenzylaminophenyl.

$R_{4-5}$, $R_{4-6}$ and $R_{4-7}$ each represent hydrogen atom, a halogen atom (chlorine, bromine, fluorine atom), a substituted or unsubstituted alkyl group (methyl, ethyl, propyl, butyl, amyl, hydroxyethyl, methoxyethyl, carboxypropyl), a substituted or unsubstituted aryl group (phenyl, tolyl, xylyl, hydroxyphenyl, carboxyphenyl, α-naphthyl, β-naphthyl) or a substituted or unsubstituted aralkyl group (benzyl, phenethyl, 3-phenylpropyl, methoxybenzyl, methylbenzyl).

$A_{4-1}\ominus$ represents an anion such as perchlorate, fluoroborate, iodide, chloride, bromide, sulfate, periodide and p-toluenesulfonate ions.

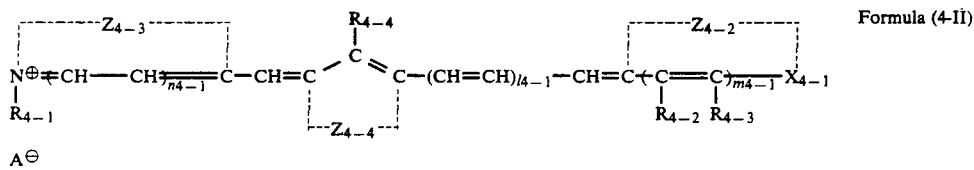

Formula (4-II)

$m_{4-1}$ and $l_{4-1}$ represent 1 or 2. $n_{4-1}$ represents 0, 1, 2 or 3. However, when $n_{4-1}$ is 2 or 3, $R_{4-5}$ may be the same or different, and $R_{4-6}$ may be also the same or different.

$Z_{4-3}$ represents a group of nonmetallic atoms necessary for the completion of substituted or unsubstituted nitrogen-containing hetero ring including, for example, thiazole type nucleus (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), benzothiazole type nucleus (e.g. benzothiazole, 5-chlorobenzothiazole, 5-methylbenzothiazole, 6-methylbenzothiazole, 5,6-dimethyl-benzothiazole, 5-bromobenzothiazole, 5-phenylbenzothiazole, 5-methoxybenzothiazole, 6-methoxybenzothiazole, 5,6-dimethoxy-benzothiazole, 5,6-dioxymethylenebenzothiazole, 5-hydroxybenzo-thiazole, 6-hydroxybenzothiazole, 4,5,6,7-tetrahydrobenzothiazole, etc.), naphthothiazole type nucleus (e.g. naphtho[2,1-d]thiazole, naphtho[1,2-d]thiazole, 5-methoxynaphtho-[1,2-d]thiazole, 5-ethoxynaphtho[1,2-d]thiazole, 8-methoxy-naphtho[2,1-d]thiazole, 7-methoxynaphtho[2,1-d]thiazole, etc.), thionaphthene[7,6-d]thiazole type nucleus (e.g. 7-methoxythionaphthene[7,6-d]thiazole), an oxazole type nucleus (e.g. 4-methyloxazole, 5-methyloxazole, 4-phenyloxazole, 4,5-diphenyloxazole, 4-ethyloxazole, 4,5-dimethyloxazole, 5-phenyloxazole), benzoxazole type nucleus (e.g. benzoxazole, 5-chlorobenzoxazole, 5-methylbenzoxazole, 5-phenylbenzoxazole, 6-methyl-benzoxazole, 5,6-dimethylbenzoxazole, 5-methoxybenzoxazole, 6-methoxybenzoxazole, 5-hydroxybenzoxazole, 6-hydroxybenzoxa-zole, etc.), naphthoxazole type nucleus (e.g. naphtho-[2,1-d]oxazole, naphtho[1,2-d]oxazole, etc.), selenazole type nucleus (e.g. 4-methylselenazole, 4-phenylselenazole, etc.), benzoselenazole type nucleus (e.g. benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, 4,5,6,7-tetrahydrobenzoselenazole, etc.), naphthoselenazole type nucleus (e.g. naphtho[2,1-d]-selenazole, naphtho[1,2- d]selenazole), thiazoline type nucleus (e.g. thiazoline, 4-methylthiazoline, 4-hydroxymethyl-4-methyl-thiazoline, 4,4-bis-hydroxymethylthiazoline, etc.), oxazoline type nucleus (e.g. oxazoline), selenazoline type nucleus (e.g. selenazoline), 2-quinoline type nucleus (e.g. quinoline, 6-methylquinoline, 6-chloroquinoline, 6-methoxyquinoline, 6-ethoxyquinoline, 6-hydroxyquinoline), 4-quinoline type nucleus (e.g. quinoline, 6-methoxyquinoline, 7-methylquinoline, 8-methylquinoline), 1-isoquinoline type nucleus (e.g. isoquinoline, 3,4-dihydroisoquinoline), 3-isoquinoline type nucleus (e.g. isoquinoline), 3,3-dialkylindolenine type nucleus (e.g. 3,3-dimethylindolenine, 3,3-dimethyl-5-chloroindolenine, 3,3,5-trimethylindolenine, 3,3,7-trimethylindolenine), pyridine type nucleus (e.g. pyridine, 5-methyl-pyridine), benzimidazole type nucleus (e.g. 1-ethyl-5,6-dichlorobenzimidazole, 1hydroxyethyl, 5,6-dichlorobenzimidazole, 1-ethyl-5-dichlorobenzimidazole, 1-ethyl-5,6-dibromobenzimidazole, 1-ethyl-5-phenylbenzimidazole, 1-ethyl-5-fluorobenzimidazole, 1-ethyl-5-dianobenzimidazole, 1-($\beta$-acetoxyethyl)-5-diano-benzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-carboxybenzimidazole, 1-ethyl-5-ethoxycarbonylbenzimidazole, 1-ethyl-5-sulfamylbenzimidazole, 1-ethyl-5-N-ethylsulfamylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl-5-trifluoromethylsulfonylbenzimidazole, 1-ethyl-5-trifluoromethylsulfinylbenzimidazole, etc.).

$Z_{4-2}$ represents a group of atoms necessary for the completion of pyran, thiopyran, selenapyran, telluropyran, benzopyran, benzothiopyran, benzoselenapyran, benzotelluropyran, naphthopyran, naphthothiopyran, naphthoselenapyran or naphthotelluropyran, each of which may be substituted. $X_{4-1}$ represents sulfur, oxygen, selenium or tellurium atom. As the substituent, there may specifically be mentioned those shown for $R_{4-2}$ and $R_{4-2}$ described below except for hydrogen atom.

$Z_{4-4}$ represents a divalent hydrocarbon capable of forming a substituted or unsubstituted 5- or 6-membered ring (—CH$_2$—CH$_2$—, —CH$_2$—CH$_2$—CH$_2$—,

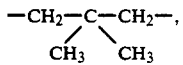

—CH=CH—, etc.).

The 5-membered or 6-membered ring may be fused with benzene ring or naphthalene ring.

$R_{4-1}$ represents hydrogen atom or an alkyl group (e.g. methyl, ethyl, n-propyl, isopropyl, n-butyl, sec-butyl, isobutyl, t-butyl, n-amyl, t-amyl, n-hexyl, n-octyl, t-octyl, etc.), and further includes other alkyls such as substituted alkyls (e.g. 2-hydroxyethyl, 3-hydroxypropyl, 2-acetoxyethyl, carboxymethyl, 2-carboxyethyl, 3-carboxypropyl, 4-sulfobutyl, 3-sulfate propyl, 4-sulfate butyl, N-(methylsulfonyl)-carbamylmethyl, 3-(acetylsulfamyl)propyl, 4-(acetylsul-famyl)butyl, etc.), cyclic alkyls (e.g. cyclohexyl, etc.), an allyl (CH$_2$=CH—CH$_2$—), aralkyls (e.g. benzyl, phenethyl, $\alpha$-naphthylmethyl, $\beta$-naphthylmethyl, etc.), substituted aralkyls (e.g. carboxybenzyl, sulfobenzyl, hydroxybenzyl, etc.).

$R_{4-2}$ and $R_{4-3}$ each form:

(a) hydrogen atom;

(b) a halogen atom: chlorine, bromine, iodine atom or a monovalent organic residue, for example, (c) an alkyl group, particularly an alkyl group having 1 to 15 carbon atoms: for example, methyl, ethyl, propyl, isopropyl, butyl, t-butyl, amyl, isoamyl, hexyl, octyl, nonyl, dodecyl (d) an alkoxy group: for example, methoxy, ethoxy, propoxy, butoxy, amyloxy, hexoxy, octoxy;

(e) an aryl group: phenyl, $\alpha$-naphthyl, $\beta$-naphthyl (f) a substituted aryl group: tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, dibenzylaminophenyl;

(g) styryl;

(h) a substituted styryl group: methoxystyryl, dimethoxystyryl, ethoxystyryl, diethoxystyryl, dimethylaminostyryl, diethylaminostyryl;

(i) a substituted or unsubstituted heterocyclic group: for example, 3-carbazolyl, 9-methyl-3-carbazolyl, 9-ethyl-3-carbazolyl, 9-carbazolyl rings $R_{4-4}$ represents hydrogen atom or a halogen atom (e.g. chlorine, bromine, iodine atom).

$A_{4-1}^{\ominus}$ represents an anion such as chloride, bromide, iodide, perchlorate, benzenesulfonate, p-toluenesulfonate, methylsulfate, ethylsulfate, propylsulfate, etc. No. $A_{4-1}^{\ominus}$ exists when $R_{4-1}$ contains an anion such as —SO$_3\ominus$, OSO$_3\ominus$, —COO$\ominus$, SO$_2\ominus$NHS—, —SO$_2$—N$\ominus$—CO— or —SO$_2$—N$\ominus$—SO$_2$—. $m_{4-1}$ and $n_{4-1}$ represent 0 or 1, and $l_{4-1}$ represents 0, 1 or 2.

The compound represented by the above Formula (4-II) may form a resonance product together with the compound represented by the following Formula (4-1), and such resonance product is included in this invention.

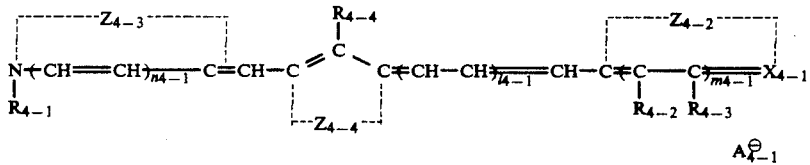

Formula (4-1)

(wherein $Z_{4-1}$, $Z_{4-3}$, $Z_{4-4}$, $R_{4-1}$ to $R_{4-4}$, $X_{4-1}$, $A_{4-1}^{\ominus}$, $l_{4-1}$, $m_{4-1}$ and $n_{4-1}$ have the same meanings as defined above. However, $Z_{4-1}$ represents a pyrylium salt type compound such as pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium.)

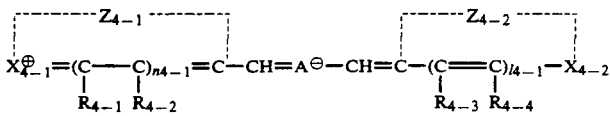

In the formula, $A_{4-1}^{\ominus}$ represents

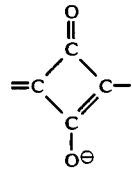

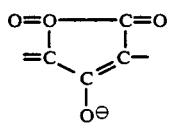

$X_{4-1}$ and $X_{4-2}$ each represent sulfur atom, oxygen atom, selenium atom or tellurium atom. $Z_{4-1}$ represents a group of atoms necessary for the completion of pyrylium, thiopyrylium, selenapyrylium, telluropyrylium, benzopyrilium, benzothiopyrylium, benzoselenapyrylium, benzotelluropyrylium, naphthopyrylium, naphthothiopyrylium, naphthoselenapyrylium or naphthotelluropyrylium. $Z_{4-2}$ represents a group of atoms necessary for the completion of pyran, thiopyran, selenapyran, telluropyran, benzopyran, benzothiopyran, benzoselenapyran, benzotelluropyran, naphthopyran, naphthothiopyran, naphthosele-napyran or naphthotelluropyran. These rings may be substituted by an alkyl group (methyl, ethyl, n-propyl, isopropyl, n-butyl, t-butyl, n-acyl, t-acyl, n-hexyl, n-octyl, t-octyl, 2-ethylhexyl, etc.), an alkoxy group (methoxy, ethoxy, propoxy, butoxy, etc.), a substituted or unsubstituted aryl group (phenyl, tolyl, xylyl, biphenyl, ethylphenyl, methoxyphenyl, ethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, dibenzylaminophenyl, etc.), a styryl group such as styryl, 4-phenyl-1,3-butadienyl, methoxystyryl, dimethoxystyryl, ethoxystyryl, diethoxystyryl, dimethylaminostyryl, 4-(p-dimethylaminophenyl)-1,3-butadienyl, 4-(p-diethylaminophenyl)-1,3-butadienyl, or 4-phenyl-1,3-butadienyl or substituted product thereof, or a heterocyclic group such as 3-carbazolyl, 9-methyl-3-carbazolyl, 9-ethyl-3-carbazolyl, 9-carbazolyl and the like.

$R_{4-1}$, $R_{4-2}$, $R_{4-3}$ and $R_{4-4}$ represent:

(a) hydrogen atom;

(b) an alkyl group, particularly an alkyl group having 1 to 15 carbon atoms: for example, methyl, ethyl, propyl, isopropyl, butyl, t-butyl, amyl, isoamyl, hexyl, octyl, nonyl and dodecyl;

(c) an alkoxy group, for example, methoxy, ethoxy, propoxy, butoxy, amyloxy, hexoxy and octoxy;

(d) an aryl: phenyl, $\alpha$-naphthyl and $\beta$-naphthyl;

(e) a substituted aryl group: tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, and benzylaminophenyl;

(f) a styryl or 4-phenyl-1,3-butadienyl group: styryl and 4-phenyl-1,3-butadienyl;

(g) a substituted styryl or 4-phenyl-1,3-butadienyl: methoxystyryl, dimethoxystyryl, ethoxystyryl, diethoxystyryl, dimethylaminostyryl, diethylaminostyryl, 4-(p-dimethyl-aminophenyl)-1,3-butadienyl and 4-(p-diethylaminophenyl)-1,3-butadienyl;

(h) $R_{4-1}$ and $R_{4-2}$, and $R_{4-3}$ and $R_{4-4}$ may be bonded to form a benzene ring.

(i) a substituted or unsubstituted heterocyclic group: for example, 3-carbazolyl, 9-methyl-3-carbazolyl, 9-ethyl-3-carbazolyl and 9-carbazolyl.

Formula (4-IV)

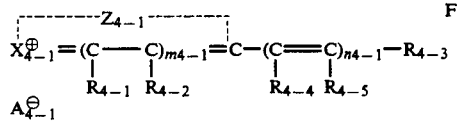

In the formula, $X_{4-1}$ represents sulfur, oxygen, selenium or tellurium atom.

$Z_{4-1}$ represents a hydrocarbon group comprising a group of atoms necessary for the completion of pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium, each of which may be substituted. The substituent may include a halogen atom such as chlorine, bromine and fluorine atom, an alkyl group such as methyl, ethyl, propyl, isopropyl, butyl, t-butyl, amyl, isoamyl, hexyl, octyl, nonyl and dodecyl; an aryl group such as phenyl, $\alpha$-naphthyl and $\beta$-naphthyl, a substituted aryl such as tolyl, xylyl, biphenyl, ethylphenyl, methoxyphenyl, ethoxyphenyl, amyloxyphenyl, dimethoxyphenyl, diethoxydiphenyl, hydroxyphenyl, chlorophenyl, dichlorophenyl, bromophenyl, dibromophenyl, nitrophenyl, diethylaminophenyl, dimethylaminophenyl and dibenzylaminophenyl, a substituted or unsubstituted styryl group such as styryl, chlorostyryl, dimethylaminostyryl, diethylaminostyryl, dipropylaminostyryl, dibutylaminostyryl, dibenzylamino-styryl, diphenylaminostyryl, methoxystyryl and ethoxystyryl.

$R_{4-1}$ and $R_{4-2}$ each represent:

(a) hydrogen atom;

(b) a substituted or unsubstituted alkyl group, particularly an alkyl having 1 to 15 carbon atoms: for example, methyl, ethyl, propyl, isopropyl, butyl, t-butyl, amyl, isoamyl, hexyl, octyl, nonyl and dodecyl;

(c) an aryl group: phenyl, $\alpha$-naphthyl and $\beta$-naphthyl;

(d) a substituted aryl group: tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl and benzylaminophenyl (e) a styryl group: styryl;

(f) a substituted styryl group: chlorostyryl, dichlorostyryl, methylstyryl, dimethylstyryl, methoxystyryl, ethoxystyryl, dimethylaminostyryl, diethylaminostyryl, dipropylaminostyryl, dibutylaminostyryl, dibenzylaminostyryl and phenylaminostyryl;

$R_{4-3}$ represents a substituted or unsubstituted aryl group (phenyl, -naphthyl, $\beta$-naphthyl, tolyl, xylyl, biphenyl, ethylphenyl, diethylphenyl, methoxyphenyl, dimethoxyphenyl, trimethoxyphenyl, ethoxyphenyl, diethoxyphenyl, amyloxyphenyl, hydroxyphenyl, chlorophenyl, dichlorophenyl, trichlorophenyl, bromophenyl, dibromophenyl, tribromophenyl, dibromophenyl, tribromophenyl, nitrophenyl, dimethylaminophenyl, diethylaminophenyl, dibenzylaminophenyl, diphenylaminophenyl), or a substituted or unsubstituted heterocyclic group (3-carbazolyl, 9-methyl-3-carbazolyl, 9-ethyl-3-carbazolyl, 7-nitro-9-ethyl-3-carbazolyl, 2-pyridyl, 4-pyridyl-4-pyridyl, 2-quinolyl, 4-quinolyl-3-indolyl, 2-phenyl-3-indolyl, 1-methyl-2-phenyl-3-indolyl).

$R_{4-4}$ and $R_{4-5}$ each represent hydrogen atom or an alkyl group (methyl, ethyl, propyl, butyl, amyl, hexyl, octyl, nonyl). $m_{4-1}$ represents 1 or 2, and $n_{4-1}$ represents 0, 1, 2 or 3. However, when $n_{4-1}$ is 2 or 3, $R_{4-4}$ may be the same or different, and further, $R_{4-5}$ may be the same or different.

$A_{4-1}\ominus$ represents an anion such as perchlorate, fluoroborate, iodide, chloride, bromide, sulfate, periodide and p-toluenesulfonate.

The coloring matter as described above has generally an absorption peak with great coefficient of absorption at around 800 nm, and also good solubility in an organic solvent as well as light resistance, thus being excellent as an optical information recording medium. Besides, while having sufficient reflectance, it tends to be crystallized with lapse of time. The present invention provides a medium with enhanced reflectance and also excellent storage stability by incorporating a metal chelate compound in such coloring matter.

Although the behaviour of these metal chelate compounds in the recording layer has not been clarified, it may be considered that they affect the stacking mutual action between the coloring matters to change the packing state and increase the refractive index in the recording layer, whereby the reflectance in the thin film state is improved. Also, it seems likely that such associated state of the coloring matter and the chelate compound inhibits crystallization to increase the storage stability.

The chelate compound to be used in the present invention should preferably have a center metal selected from transition metals such as Zn, Cu, Ni, Co, Mn, Pd, Zr, etc.

Specific examples of the chelate compounds which can be used as the stabilizer as described above are mentioned below:

(1) thiosalicylaldoxime type compound represented by the following formula:

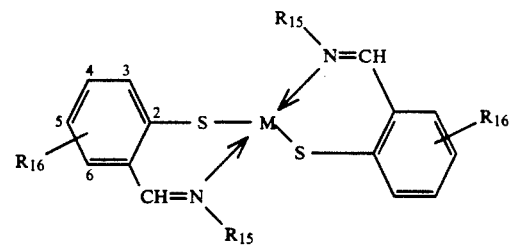

wherein each $R_{15}$ represents hydrogen atom, hydroxyl, alkyl or aryl, and may be also bonded to another $R_{15}$; each $R_{16}$ represents alkyl, halogen atom, hydrogen atom, nitro or benzo-fused type group; and the center metal M represents Cu, Ni, Co or Pd.

| Compound No. | $R_{15}$ | $R_{16}$ | M |
|---|---|---|---|
| M-1-1 | OH | H | Cu |
| M-1-2 | OH | H | Ni |
| M-1-3 | H | 4-$C_2H_5$ | Ni |
| M-1-4 | $C_2H_5$ | 5-Cl | Ni |
| M-1-5 | i-$C_3H_7$ | H | Co |
| M-1-6 | n-$C_6H_{13}$ | 4-$CH_3$ | Ni |
| M-1-7 | n-$C_6H_{13}$ | 4-$CH_3$ | Pd |
| M-1-8 | $C_6H_5$ | H | Ni |
| M-1-9 | H | 5,6-$C_6H_4$ | Ni |
| M-1-10 | —$CH_2$— | 4-$NO_2$ | Ni |

(2) salicylaldoxime type compound represented by the following formula:

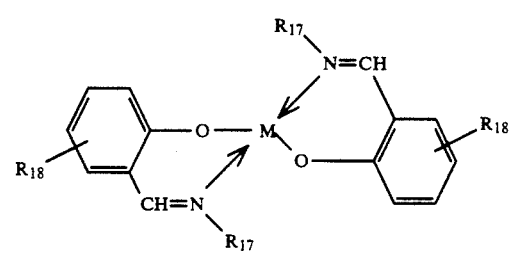

wherein each $R_{17}$ represents hydrogen atom, hydroxyl, alkyl, aryl and may be also bonded to another $R_{17}$; each $R_{18}$ represents hydrogen atom, halogen atom, alkyl, nitro or benzo-fused type group; and M represents Cu, Ni, Co or Pd.

| Compound No. | $R_{17}$ | $R_{18}$ | M |
|---|---|---|---|
| M-2-1 | H | H | Cu |
| M-2-2 | $CH_3$ | H | Ni |
| M-2-3 | OH | 5-$C_2H_5$ | Cu |
| M-2-4 | $C_2H_5$ | 5-$C_2H_5$ | Ni |
| M-2-5 | $C_3H_7$ | 4-Cl | Ni |
| M-2-6 | $(CH_2)_5CH_3$ | 4-$CH_3$ | Ni |
| M-2-7 | $(CH_2)_{11}CH_3$ | 5,6-$C_6H_4$ | Ni |
| M-2-8 | i-$C_3H_7$ | 5,6-$C_6H_4$ | Co |
| M-2-9 | OH | 4-$C_3H_7$ | Co |
| M-2-10 | OH | H | Pd |
| M-2-11 | —$CH_2$— | 4-$NO_2$ | Ni |
| M-2-12 | —$CH_2$— | 4-$NO_2$ | Cu |

(3) thioacetothiophenone type compound:

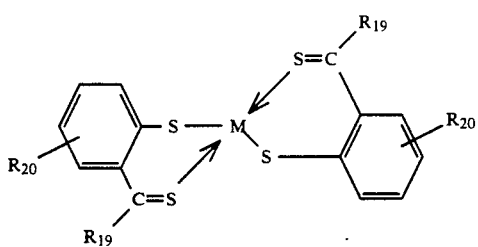

wherein each $R_{19}$ represents alkyl or aryl; each $R_{20}$ hydrogen atom, halogen atom, alkyl, aryl, nitro or benzo-fused type group; and M represents Cu, Ni or Pd.

| Compound No. | $R_{19}$ | $R_{20}$ | M |
|---|---|---|---|
| M-3-1 | $CH_3$ | H | Ni |
| M-3-2 | $C_2H_5$ | 4-$CH_3$ | Ni |
| M-3-3 | $C_6H_5$ | 4-$C_2H_5$ | Ni |
| M-3-4 | 4'-$(CH_3)_2N$—$C_6H_4$— | H | Ni |
| M-3-5 | 4'-Cl—$C_6H_4$— | 4-$CH_3$ | Ni |
| M-3-6 | $CH_3$ | 4-$CH_3$ | Pd |
| M-3-7 | $C_2H_5$ | 4-Cl | Pd |
| M-3-8 | $CH_3$ | 4-$NO_2$ | Ni |
| M-3-9 | $C_6H_5$ | $C_6H_5$ | Ni |

(4) acetothiophenone type compound:

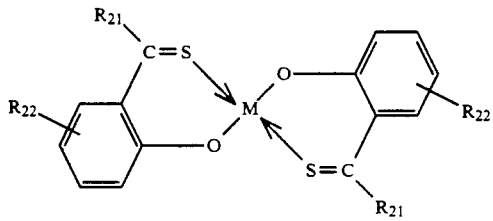

wherein each $R_{21}$ represents alkyl or aryl; each $R_{22}$ represents hydrogen atom, halogen atom, alkyl or benzo-fused type group; and M represents Cu, Ni or Pd.

| Compound No. | $R_{21}$ | $R_{22}$ | M |
|---|---|---|---|
| M-4-1 | $CH_3$ | H | Cu |
| M-4-2 | $C_2H_5$ | 4-$CH_3$ | Cu |
| M-4-3 | $CH_3$ | H | Ni |
| M-4-4 | $C_3H_7$ | 4-$CH_3$ | Ni |
| M-4-5 | $(CH_2)_5CH_3$ | $C_6H_5$ | Ni |
| M-4-6 | $(CH_2)_7CH_3$ | $C_6H_5$ | Ni |
| M-4-7 | $C_2H_5$ | 5,6-$C_6H_4$ | Ni |
| M-4-8 | $CH_3$ | H | Pd |
| M-4-9 | $(CH_2)_5CH_3$ | 4-Cl | Pd |

(5) oxyxanthione type compound:

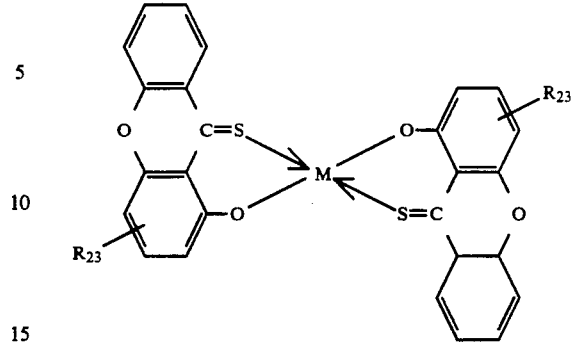

wherein each $R_{23}$ represents hydrogen atom, halogen atom or alkyl; and M represents Cu or Ni.

| Compound No. | $R_{23}$ | M |
|---|---|---|
| M-5-1 | H | Cu |
| M-5-2 | H | Ni |
| M-5-3 | 4-$CH_3$ | Ni |

(6) pyromeconic acid type compound:

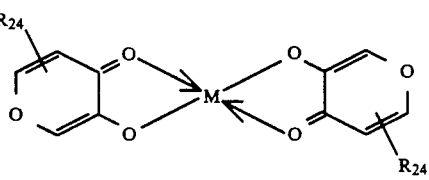

wherein $R_{24}$ represents hydrogen atom or alkyl; and M represents Cu, Ni, Co or Mn.

| Compound No. | $R_{24}$ | M |
|---|---|---|
| M-6-1 | H | Mn |
| M-6-2 | H | Ni |
| M-6-3 | 2-$C_2H_5$ | Ni |

(7) bis-dithionickel type compound:

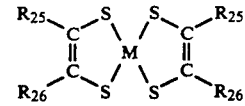

wherein $R_{25}$ and $R_{26}$ each represent substituted or unsubstituted alkyl, acyl or aryl, or $R_{25}$ and $R_{26}$ may form an aromatic ring; M represents Cu, Ni, Co or Pd; in this case M may have negative charge and counter-cation.

| Compound No. | $R_{25}$ | $R_{26}$ | M |
|---|---|---|---|
| M-7-1 | $C_6H_5$ | $C_6H_5$ | Cu |
| M-7-2 | $C_6H_5$ | $C_6H_5$ | Ni |
| M-7-3 | p-$(C_2H_5)_2N$—$C_6H_4$ | $C_6H_5$ | Ni |
| M-7-4 | p-$(CH_3)_2N$—$C_6H_4$ | $C_6H_5$ | Ni |
| M-7-5 | $CH_3CO$ | $CH_3CO$ | Ni |
| M-7-6 | —CH=CH—CH=CH— | | Ni |
| M-7-7 | —CH=C—C=CH—<br>       \|   \|<br>      Cl  Cl | | Ni |
| M-7-8 | —CH=C—CH=CH—<br>       \|<br>      $N(C_2H_5)_2$ | | Ni |

-continued

| Compound No. | $R_{25}$ | $R_{26}$ | M |
|---|---|---|---|
| M-7-9 | —CH=C—CH=CH—<br>      \|<br>     CH$_3$ | | Ni |
| M-7-10 | —CH=C——C=CH—<br>      \|    \|<br>     CH$_3$ CH$_3$ | | Ni |
| M-7-11 | —CH=CH—CH=CH— | | Co |

(8) mercaptobenzothiazole type compound:

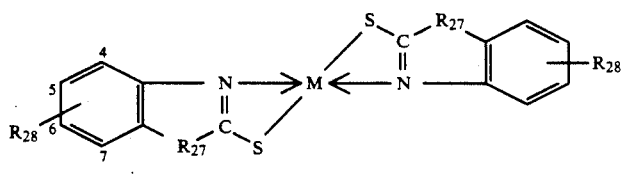

wherein each $R_{27}$ represent sulfur atom, substituted or unsubstituted amino group, oxygen atom or thioketone group; each $R_{28}$ represents hydrogen atom, alkyl, halogen atom or amino group; and M represents Zn, Cu or Ni.

| Compound No. | $R_{27}$ | $R_{28}$ | M |
|---|---|---|---|
| M-8-1 | O | H | Zn |
| M-8-2 | O | 5-CH$_3$ | Zn |
| M-8-3 | S | H | Ni |
| M-8-4 | S | 5-Cl | Ni |
| M-8-5 | S | 5-CH$_3$ | Ni |
| M-8-6 | S | 4-CH$_3$ | Ni |
| M-8-7 | S | 5-(CH$_3$)$_2$N | Ni |
| M-8-8 | NH | H | Ni |
| M-8-9 | NH | 5-CH$_3$ | Ni |
| M-8-10 | NCH$_3$ | H | Ni |
| M-8-11 | NH | 6-C$_2$H$_5$ | Ni |
| M-8-12 | C=S | H | Ni |

(9) hydroxamic acid type compound:

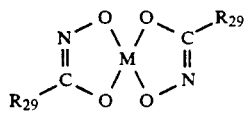

wherein each $R_{29}$ represents alkyl, aryl or styryl; and M represents Cu, Ni or Co.

| No. | $R_{29}$ | M |
|---|---|---|
| M-9-1 | C$_3$H$_7$ | Cu |
| M-9-2 | C$_6$H$_5$ | Ni |
| M-9-3 | C$_6$H$_5$CH=CH— | Ni |
| M-9-4 | Cl—C$_6$H$_4$CH=CH— | Ni |

(10) biscyclopentadiene type compound:

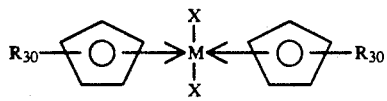

wherein each $R_{30}$ represents hydrogen atom, halogen atom, alkyl, acyl or aryl; and M represents Ni or Zr.

| No. | $R_{30}$ | M | X |
|---|---|---|---|
| M-10-1 | H | Ni | — |
| M-10-2 | H | Zr | Cl |
| M-10-3 | CH$_3$CO | Ni | — |
| M-10-4 | Cl | Ni | — |
| M-10-5 | C$_3$H$_7$ | Ni | — |

(11) nitrosohydroxylamine type compound:

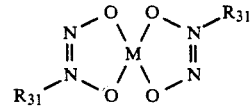

wherein each $R_{31}$ represents alkyl or aryl; and M represents Cu, Ni or Co.

| No. | $R_{31}$ | M |
|---|---|---|
| M-11-1 | C$_3$H$_7$ | Cu |
| M-11-2 | C$_3$H$_7$ | Ni |
| M-11-3 | p-(CH$_3$)$_2$N—C$_6$H$_4$— | Cu |
| M-11-4 | p-(CH$_3$)$_2$N—C$_6$H$_4$— | Ni |

(12) dioxime type compound:

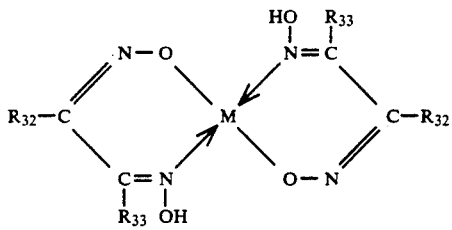

wherein $R_{32}$ and $R_{33}$ each represent alkyl or aryl; and M represents Ni.

| No. | $R_{32}$ | $R_{33}$ | M |
|---|---|---|---|
| M-12-1 | CH$_3$ | CH$_3$ | Ni |
| M-12-2 | C$_2$H$_5$ | C$_2$H$_5$ | Ni |
| M-12-3 | C$_6$H$_5$ | C$_6$H$_5$ | Ni |

(13) glyoxime type compound:

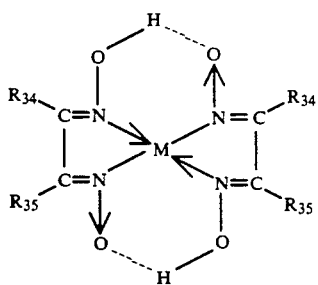

wherein $R_{34}$ and $R_{35}$ each represent alkyl, amino, aryl or furan, or $R_{34}$ and $R_{35}$ may form an alicyclic compound; M represents Ni.

| No. | $R_{34}$ | $R_{35}$ |
|---|---|---|
| M-13-1 | $NH_2$ | $NH_2$ |
| M-13-2 | $C_6H_5$ | $C_6H_5$ |
| M-13-3 | furan | furan |
| M-13-4 | $-CH_2CH_2-$ | $-CH_2CH_2-$ |
| ($R_{34}$ and $R_{35}$ are bonded to from a ring.) | | |
| M-13-5 | $CH_3$ | $CH_3$ |
| M-13-6 | $C_2H_5$ | $C_2H_5$ |

(14) compound represented by the following formula:

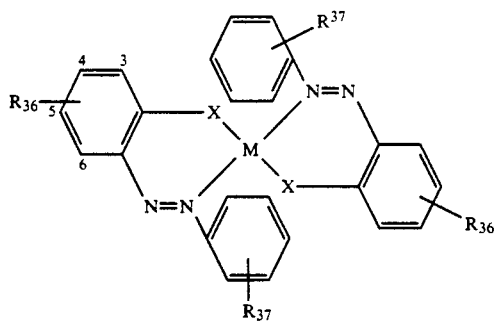

wherein $R_{36}$ and $R_{37}$ each represents hydrogen atom, halogen atom or alkyl; X represents oxygen or sulfur atom; and M represents Ni.

| No. | $R_{36}$ | $R_{37}$ | X |
|---|---|---|---|
| M-14-1 | H | H | O |
| M-14-2 | 5-$CH_3$ | m-$CH_3$ | O |
| M-14-3 | 4-$CH_3$ | m-$CH_3$ | O |
| M-14-4 | 5-Cl | p-Cl | O |
| M-14-5 | H | H | S |
| M-14-6 | 5-$CH_3$ | m-$CH_3$ | S |
| M-14-7 | 4-$CH_3$ | m-$C_2H_5$ | S |
| M-14-8 | 5-Cl | p-$C_2H_5$ | S |

(15) compound represented by the following formula:

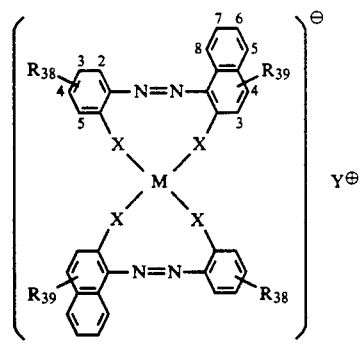

wherein $R_{38}$ and $R_{39}$ each represent hydrogen atom, alkyl, halogen atom or nitro; X represents oxygen or sulfur atom; M represents Ni; and $Y^\oplus$ represents quaternary ammonium cation.

| No. | $R_{38}$ | $R_{39}$ | X |
|---|---|---|---|
| M-15-1 | 3-$CH_3$ | H | O |
| M-15-2 | 3-Cl | 4-$CH_3$ | O |
| M-15-3 | 4-$NO_2$ | 4-$CH_3$ | O |
| M-15-4 | H | 4-$CH_3$ | S |
| M-15-5 | 3-$NO_2$ | 4-$C_2H_5$ | S |

(16) compound represented by the following formula:

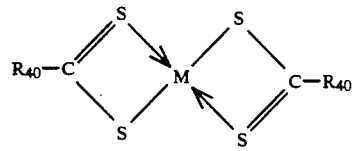

wherein each $R_{40}$ represents amino; and M represents Cu, Ni, Co or Pd.

| No. | $R_{40}$ | M |
|---|---|---|
| M-16-1 | $(C_4H_{11})_2N$ | Ni |
| M-16-2 | $(C_5H_{11})_2N$ | Ni |

(17) anthranylic acid type compound:

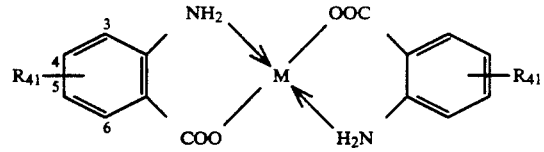

wherein each $R_{41}$ represents hydrogen atom, halogen atom, alkyl, acyl, nitro or alkoxy; and M represents Zn, Cu, Ni or Co.

| No. | $R_{41}$ | M |
|---|---|---|
| M-17-1 | H | Cu |
| M-17-2 | 4-Cl | Ni |
| M-17-3 | 4-$NO_2$ | Ni |
| M-17-4 | 5-$CH_3$ | Ni |

By combining such metal chelate compound with a coloring matter, reflectance can be enhanced, storage stability can be improved and also a high C/N value can be obtained. Such chelate compound should be preferably contained in an amount of about 1 to 60 wt. % based on the total weight of the recording material for forming the recording layer, preferably 5 to 60 wt. %, more preferably 5 to 40 wt. %.

Mentioned below are the typical examples of polymethine compounds represented by the foregoing general formula (1-I).

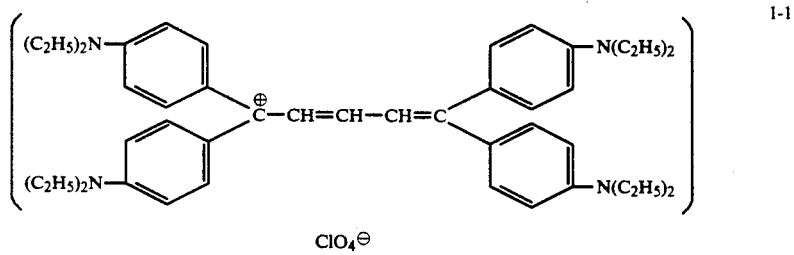

1-1

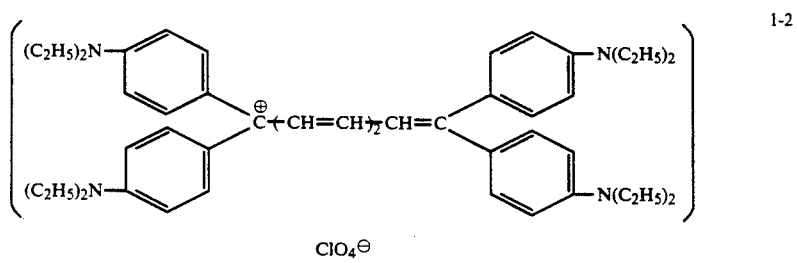

1-2

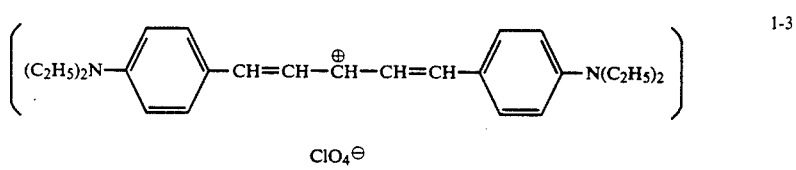

1-3

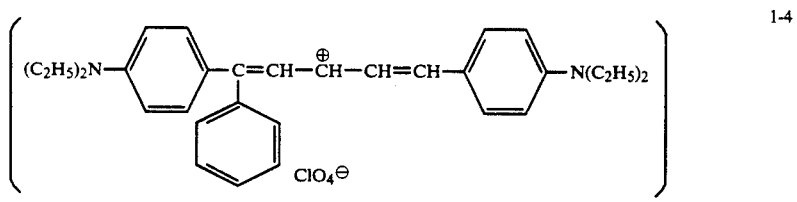

1-4

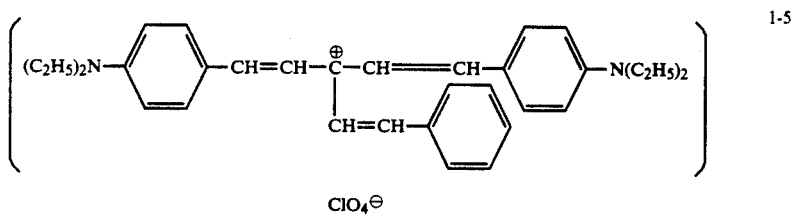

1-5

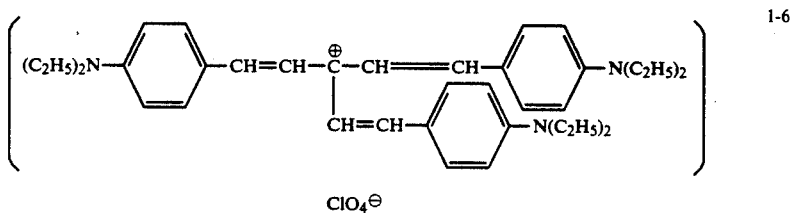

1-6

-continued
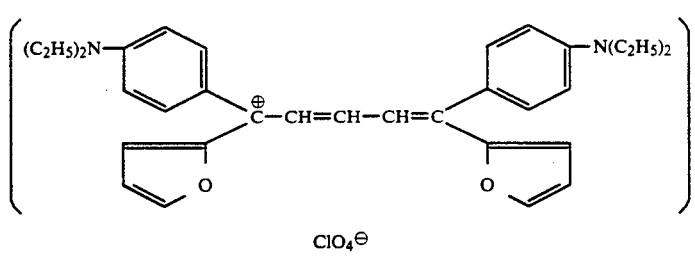
1-7
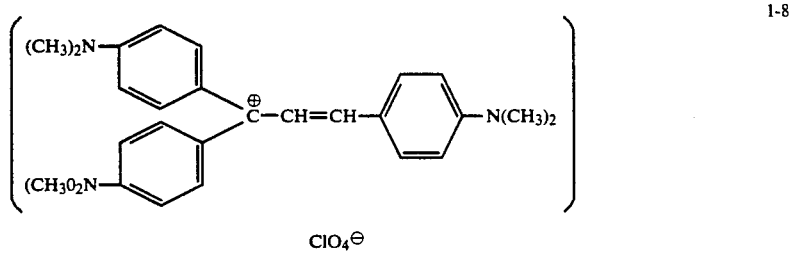
1-8
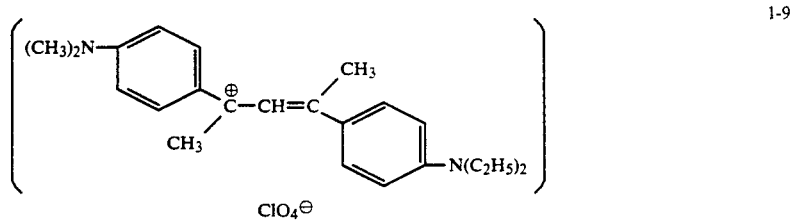
1-9
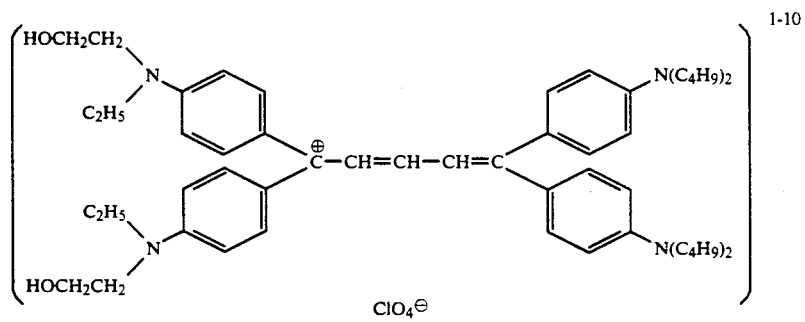
1-10
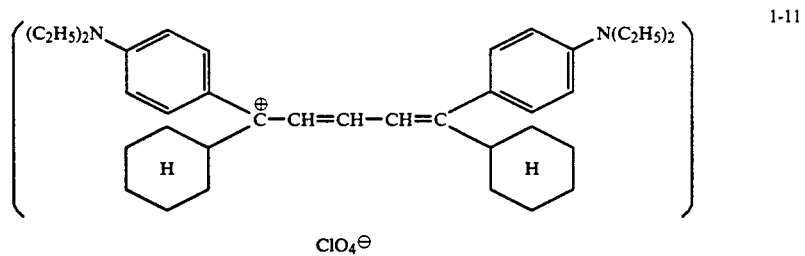
1-11
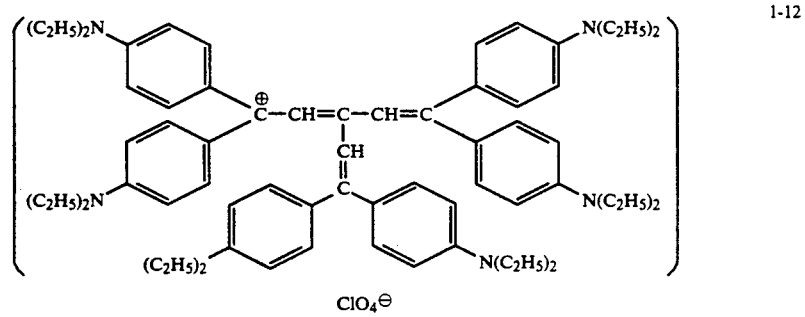
1-12

-continued
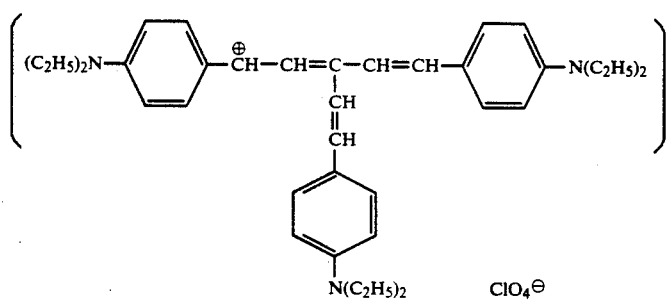
1-13
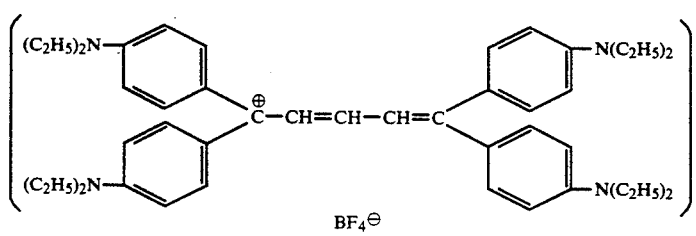
1-14
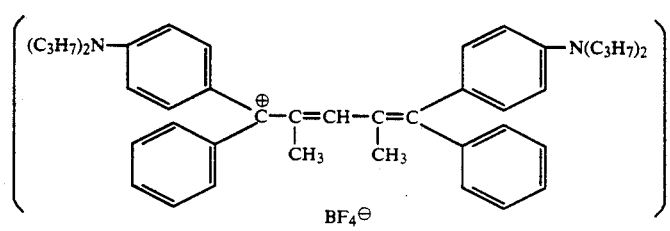
1-15
These polymethine compounds can be obtained easily by synthesis according to the synthetic methods as disclosed in Bernard S. Wildi et al., Journal of American Chemical Society, 80, 3772–3777 (1958); H. Schmidt et al. Ann. (Liebig Annalen der Chemie) 623, 204–216; or R. Wlzinger et al., Helvetica Chimica Acta, 24, 369.

Mentioned below are the typical examples of compounds represented by the formulae (2-I)–(2-III).

| Compound No. | General Formula No. | $A_{2-1}$ | $D_{2-1}$ | $B_{2-1}$ | $E_{2-1}$ | $R_{2-1}$ | $R_{2-2}$ | $R_{2-3}$ | $R_{2-4}$ | $R_{2-5}$ | $m_{2-1}$ | $n_{2-1}$ | $Y_{2-1}$ | $Z_{2-1}$ | $X_{2-1}$ |
|---|---|---|---|---|---|---|---|---|---|---|---|---|---|---|---|
| 2-1 | 2-I | –C₆H₄–OCH₃ | ↓ | ↓ | H | — | — | — | — | — | 0 | 0 | ⟨CH₂⟩₂ | — | Cl |
| 2-2 | 2-I | –C₆H₄–N(C₂H₅)₂ | ↓ | ↓ | Cl | — | — | — | — | — | 0 | 0 | ⟨CH₂⟩₂ | — | ClO₄ |
| 2-3 | 2-I | –C₆H₄–N(C₂H₅)₂ | ↓ | H | H | — | — | — | — | — | 0 | 0 | ⟨CH₂⟩₂ | — | ClO₄ |
| 2-4 | 2-I | –C₆H₄–(pyrrolidino) | ↓ | H | Cl | — | — | — | — | — | 0 | 0 | ⟨CH₂⟩₂ | — | ClO₄ |
| 2-5 | 2-I | –C₆H₄–N(C₂H₅)₂ | ↓ | –C₆H₄–CH₃ | Cl | — | — | — | — | — | 0 | 0 | ⟨CH₂⟩₂ | — | ClO₄ |
| 2-6 | 2-I | –C₆H₄–N(C₂H₅)₂ | ↓ | –C₆H₄–CH₃ | H | — | — | — | — | — | 0 | 0 | ⟨CH₂⟩₂ | — | BF₄ |
| 2-7 | 2-I | –C₆H₄–N(CH₃)₂ | ↓ | –C₆H₄–OC₂H₅ | H | — | — | — | — | — | 0 | 0 | ⟨CH₂⟩₂ | — | ClO₄ |
| 2-8 | 2-I | –C₆H₄–N(CH₃)₂ | ↓ | –CH₃ | Cl | H | ↓ | ↓ | ↓ | ↓ | 1 | 1 | ⟨CH₂⟩₂ | — | ClO₄ |

-continued

Mentioned below are the typical examples of compounds represented by the formulae (2-I)–(2-III).

| Compound No. | General Formula No. | $A_{2-1}$ | $D_{2-1}$ | $B_{2-1}$ | $E_{2-1}$ | $R_{2-1}$ | $R_{2-2}$ | $R_{2-4}$ | $R_{2-3}$ | $R_{2-5}$ | $m_{2-1}$ | $n_{2-1}$ | $Y_{2-1}$ | $Z_{2-1}$ | $X_{2-1}$ |
|---|---|---|---|---|---|---|---|---|---|---|---|---|---|---|---|
| 2-9 | 2-I | ⌬–N(C$_2$H$_5$)$_2$ | ↓ | –CH$_3$ | ↓ | H | ↓ | — | H | — | 1 | 0 | ⁺(CH$_2$)₂⁻ | — | ⌬–SO$_3$–⌬–CH$_3$ |
| 2-10 | 2-I | ⌬–N(C$_2$H$_5$)$_2$ | ↓ | –CH$_3$ | ↓ | Cl | ↓ | — | H | — | 1 | 0 | ⁺(CH$_2$)₂⁻ | — | ClO$_4$ |
| 2-11 | 2-I | ⌬–N(C$_2$H$_5$)$_2$ | ↓ | ↓ | ↓ | H | — | — | — | — | 0 | 0 | –CH$_2$–C(CH$_3$)$_2$–CH$_2$– | — | ClO$_4$ |
| 2-12 | 2-I | ⌬–N(C$_2$H$_5$)$_2$ | ↓ | ↓ | ↓ | CH$_3$ | — | — | — | — | 0 | 0 | ⁺(CH$_2$)₂⁻ | 0 | ClO$_4$ |
| 2-13 | 2-I | ⌬–N(C$_2$H$_5$)$_2$ | ↓ | ↓ | ↓ | CH$_3$ | H | — | H | — | 2 | 0 | ⁺(CH$_2$)₂⁻ | — | ClO$_4$ |
| 2-14 | 2-II | ⌬–N(CH$_3$)$_2$ | ↓ | ↓ | ↓ | Cl | H | — | H | — | — | — | ⁺(CH$_2$)₂⁻ | — | ClO$_4$ |
| 2-15 | 2-II | ⌬–N(CH$_3$)$_2$ | ↓ | ⌬ | ↓ | Cl | H | — | H | — | — | — | ⁺(CH$_2$)₂⁻ | — | BF$_4$ |
| 2-16 | 2-II | ⌬–N(CH$_3$)$_2$ | ↓ | ⌬–CH$_3$ | ↓ | H | CH$_3$ | CH$_3$ | CH$_3$ | — | — | — | ⁺(CH$_2$)₂⁻ | — | ⌬–SO$_3$–⌬–CH$_3$ |

-continued

Mentioned below are the typical examples of compounds represented by the formulae (2-I)-(2-III).

| Compound No. | General Formula No. | $A_{2-1}$ | $D_{2-1}$ | $B_{2-1}$ | $E_{2-1}$ | $R_{2-1}$ | $R_{2-2}$ | $R_{2-4}$ | $R_{2-3}$ | $R_{2-5}$ | $m_{2-1}$ | $n_{2-1}$ | $Y_{2-1}$ | $Z_{2-1}$ | $X_{2-1}$ |
|---|---|---|---|---|---|---|---|---|---|---|---|---|---|---|---|
| 2-17 | 2-II | $N(CH_3)_2$–C$_6$H$_4$– | ⇒ | 4-OC$_2$H$_5$–C$_6$H$_4$– | ⇒ | Cl | H | — | H | — | — | — | –(CH$_2$)– (o-methylbenzyl) | — | ClO$_4$ |
| 2-18 | 2-II | $N(C_2H_5)_2$–C$_6$H$_4$– | ⇒ | C$_6$H$_5$– | ⇒ | Cl | Cl | — | Cl | — | — | — | –(CH$_2$)– (o-methylbenzyl) | — | BF$_4$ |
| 2-19 | 2-II | $N(C_2H_5)_2$–C$_6$H$_4$– | ⇒ | 4-OC$_2$H$_5$–C$_6$H$_4$– | ⇒ | H | H | — | H | — | — | — | –CH$_2$–C(CH$_3$)$_2$–CH$_2$– | — | ClO$_4$ |
| 2-20 | 2-II | $N(C_2H_5)_2$–C$_6$H$_4$– | ⇒ | 6-methylpyridin-2-yl | ⇒ | Br | CH$_3$ | — | CH$_3$ | — | — | — | –(CH$_2$)– | — | 4-CH$_3$–C$_6$H$_4$–SO$_3$ |
| 2-21 | 2-II | $N(C_2H_5)_2$–C$_6$H$_4$– | ⇒ | C$_6$H$_5$– | ⇒ | H | H | — | H | — | — | — | $\{$CH$_2$$\}_\pi$ | — | BF$_4$ |
| 2-22 | 2-II | $N(C_2H_5)_2$–C$_6$H$_4$– | ⇒ | 4-Cl–C$_6$H$_4$– | ⇒ | Cl | H | — | H | — | — | — | –(CH$_2$)– (o-methylbenzyl) | — | ClO$_4$ |
| 2-23 | 2-II | $N(CH_2$–C$_6$H$_4$–)$_2$– | ⇒ | C$_6$H$_5$– | ⇒ | Cl | H | — | H | — | — | — | $\{$CH$_2$$\}_\pi$ | — | I |

-continued

Mentioned below are the typical examples of compounds represented by the formulae (2-I)–(2-III).

| Compound No. | General Formula No. | $A_{2-1}$ | $D_{2-1}$ | $B_{2-1}$ | $E_{2-1}$ | $R_{2-1}$ | $R_{2-2}$ | $R_{2-4}$ | $R_{2-3}$ | $R_{2-5}$ | $m_{2-1}$ | $n_{2-1}$ | $Y_{2-1}$ | $Z_{2-1}$ | $X_{2-1}$ |
|---|---|---|---|---|---|---|---|---|---|---|---|---|---|---|---|
| 2-24 | 2-III | ⌬—N(CH$_3$)$_2$ | ↓ | ↓ | ↓ | H | ↓ | ↓ | ↓ | — | 1 | 1 | — | $Z_{10}$ | I |
| 2-25 | 2-III | ⌬—N(CH$_3$)$_2$ | ↓ | ⌬—CH$_3$ | ↓ | H | ↓ | ↓ | ↓ | — | 1 | 1 | — | $Z_{20}$ | ClO$_4$ |
| 2-26 | 2-III | ⌬—N(CH$_3$)$_2$ | ↓ | ⌬—OC$_2$H$_5$ | ↓ | H | ↓ | ↓ | ↓ | — | 1 | 1 | — | $Z_{20}$ | ClO$_4$ |
| 2-27 | 2-III | ⌬—N(C$_2$H$_5$)$_2$ | ↓ | ↓ | ↓ | H | ↓ | ↓ | ↓ | — | 0 | 0 | — | $Z_{20}$ | BF$_4$ |
| 2-28 | 2-III | ⌬—N(C$_2$H$_5$)$_2$ | ↓ | CH$_3$ | ↓ | H | Cl | H | Cl | — | 1 | 1 | — | $Z_{10}$ | ClO$_4$ |
| 2-29 | 2-III | ⌬—N(C$_2$H$_5$)$_2$ | ↓ | Cl—⌬—Cl | ↓ | H | ↓ | ↓ | ↓ | — | 1 | 1 | — | $Z_{20}$ | ClO$_4$ |
| 2-30 | 2-III | ⌬—N(CH$_3$)(C$_2$H$_5$) | ↓ | ⌬ | ↓ | H | ↓ | ↓ | ↓ | — | 1 | 1 | — | $Z_{10}$ | I |
| 2-31 | 2-III | ⌬—N(CH$_3$)$_2$ | ↓ | ⌬—CH(CH$_3$)$_2$ | ↓ | — | — | — | — | — | 0 | 0 | — | $Z_{10}$ | ClO$_4$ |

-continued

Mentioned below are the typical examples of compounds represented by the formulae (2-I)–(2-III).

| Compound No. | General Formula No. | $A_{2\text{-}1}$ | $D_{2\text{-}1}$ | $B_{2\text{-}1}$ | $E_{2\text{-}1}$ | $R_{2\text{-}1}$ | $R_{2\text{-}2}$ | $R_{2\text{-}4}$ | $R_{2\text{-}3}$ | $R_{2\text{-}5}$ | $m_{2\text{-}1}$ | $n_{2\text{-}1}$ | $Y_{2\text{-}1}$ | $Z_{2\text{-}1}$ | $X_{2\text{-}1}$ |
|---|---|---|---|---|---|---|---|---|---|---|---|---|---|---|---|
| 2-32 | 2-III | 4-(N-methyl-N-cyclopentylamino)phenyl | ↓ | phenyl | ↓ | — | — | — | — | — | 0 | 0 | — | $Z_{10}$ | $BF_4$ |
| 2-33 | 2-III | 4-(N,N-diethylamino)phenyl | ↓ | furyl | ↓ | — | — | — | — | — | 0 | 0 | — | $Z_{10}$ | $ClO_4$ |
| 2-34 | 2-III | 4-(N,N-diethylamino)phenyl | ↓ | furyl | ↓ H | ↓ | ↓ | ↓ | ↓ | ↓ | 1 | 1 | — | $Z_{10}$ | $ClO_4$ |

Mentioned below are the concrete examples of coloring matters represented by the foregoing general formulae (3-1)-(3-11).
The examples of compounds represented by the foregoing general formula (3-1).
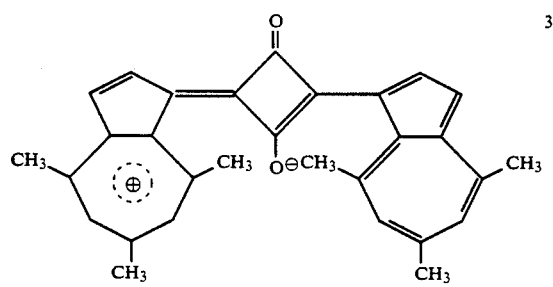
3-1
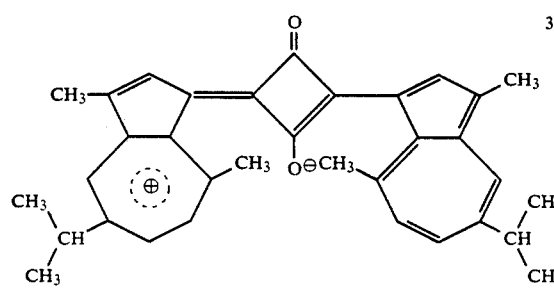
3-2
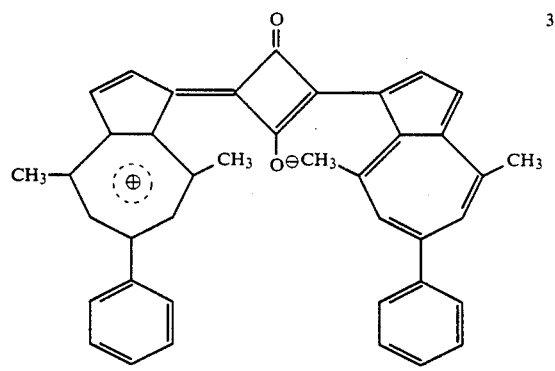
3-3
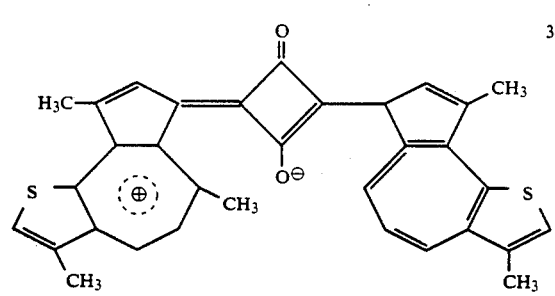
3-4
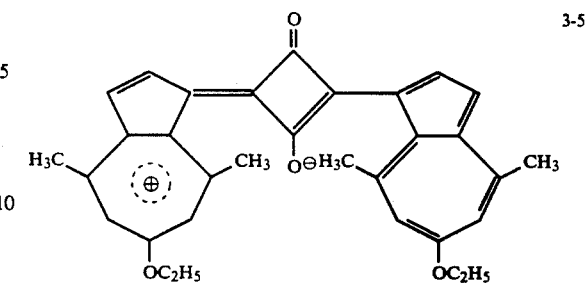
3-5
The examples of compounds represented by the foregoing general formula (3-2).
3-6
3-7
3-8
The examples of compounds represented by the foregoing general formula (3-3).
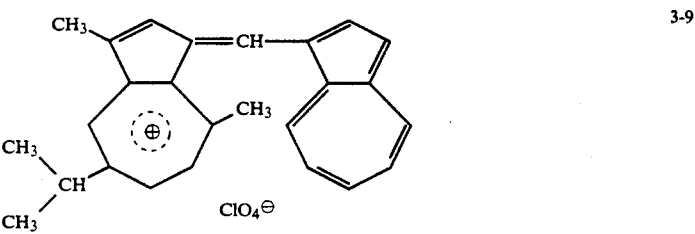
3-9

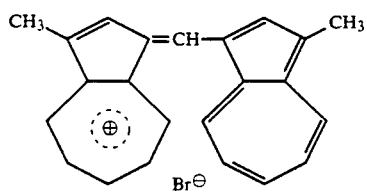
3-10
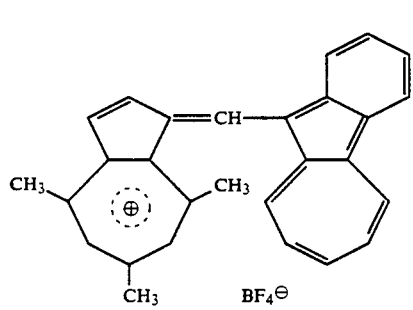
3-11
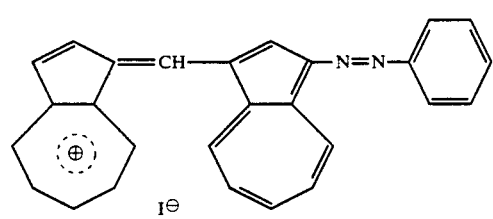
3-12
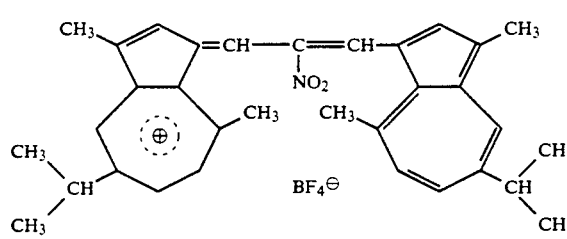
3-13
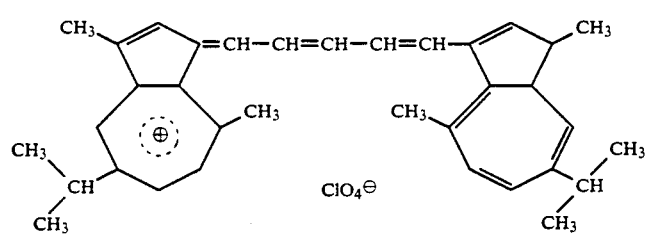
3-14
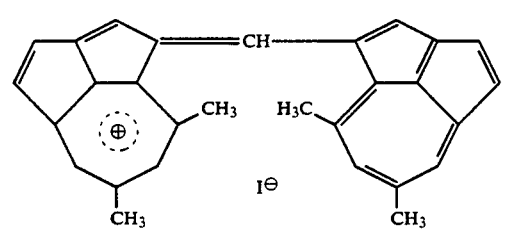
3-15
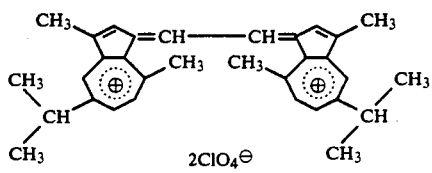
3-16
The examples of compounds represented by the foregoing general formula (3-4).

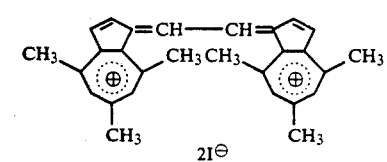
3-17
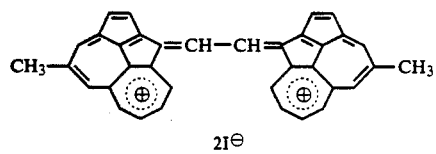
3-18
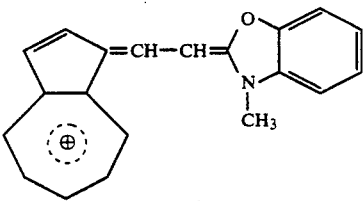
3-23
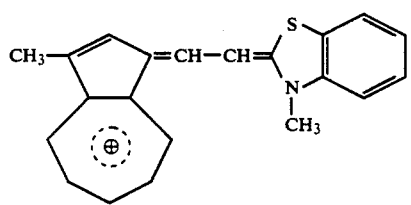
3-24
The examples of compounds represented by the foregoing general formula (3-5).
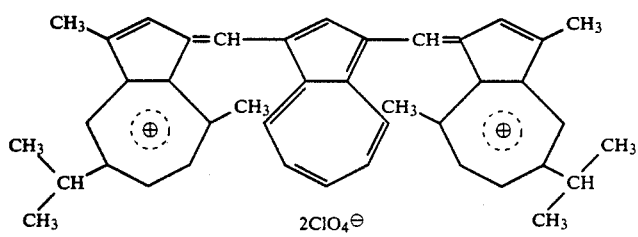
3-19
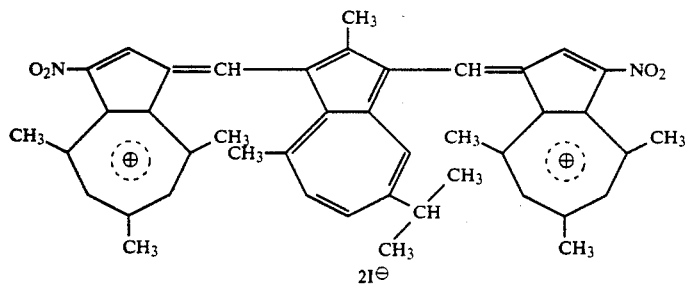
3-20
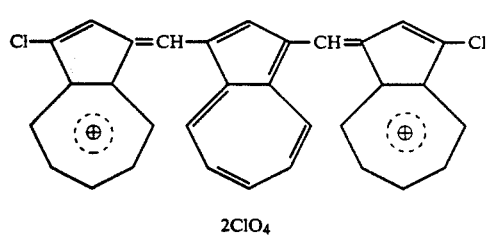
3-21
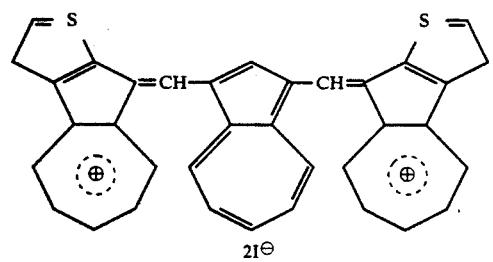
3-22
The examples of compounds represented by the foregoing general formula (3-6).

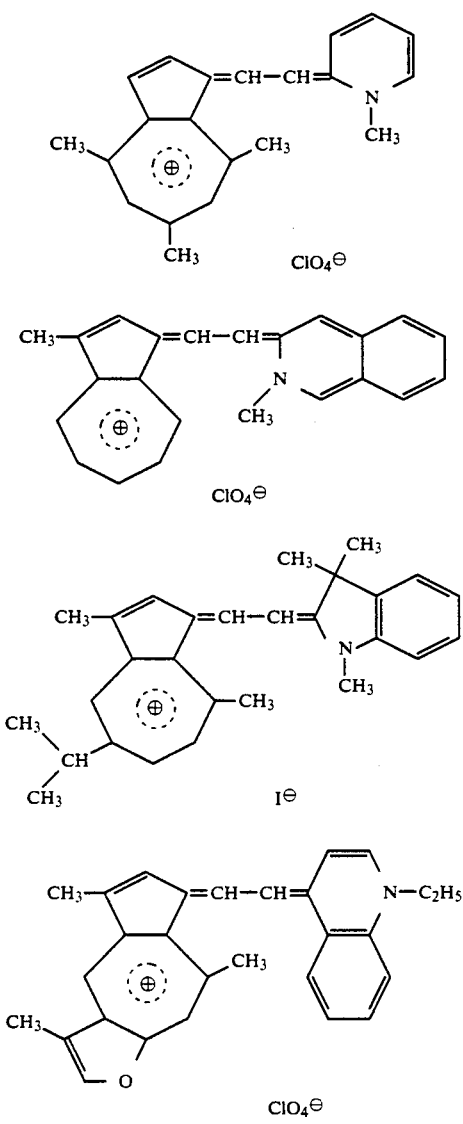
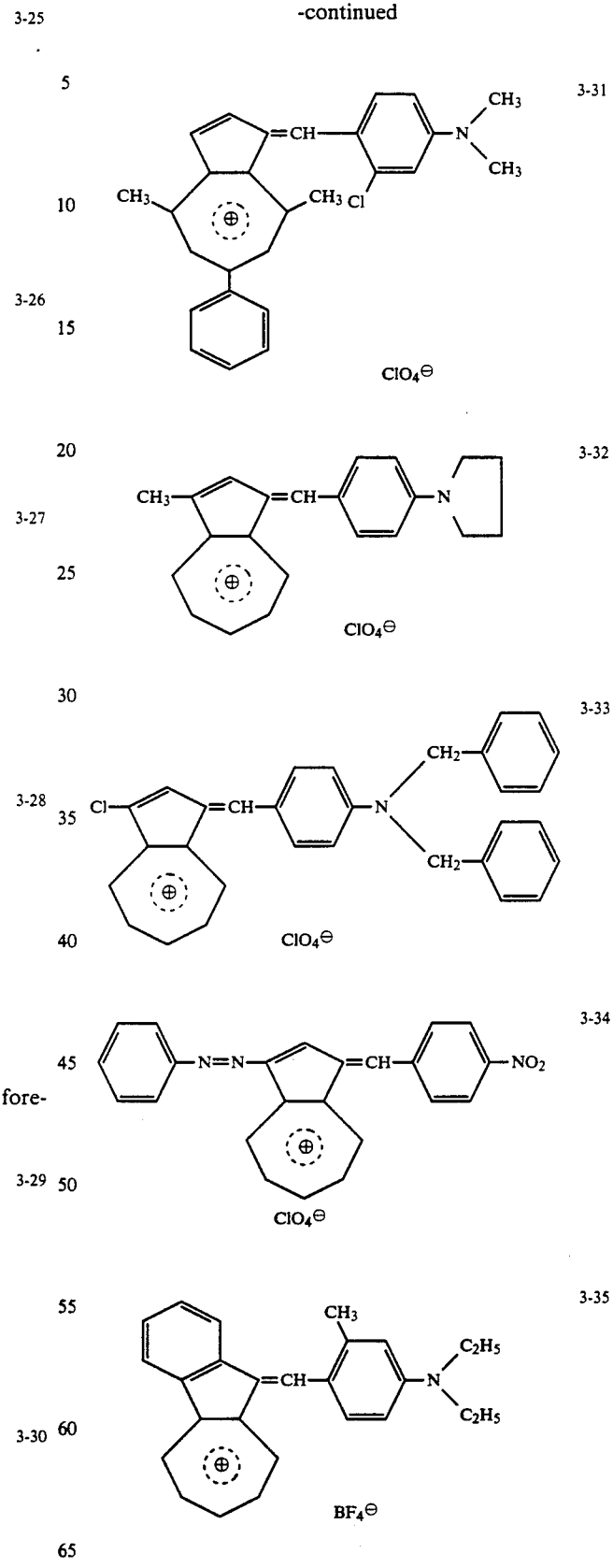
The examples of compounds represented by the foregoing formula (3-7).
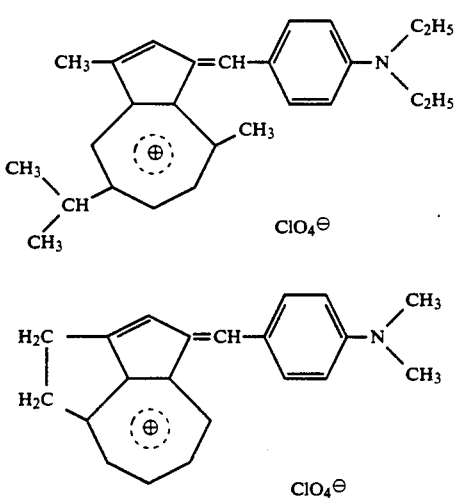
The examples of compounds represented by the foregoing general formula (3-8).

3-36
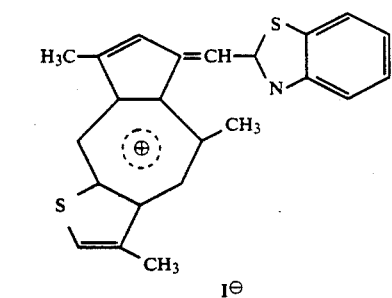
3-39
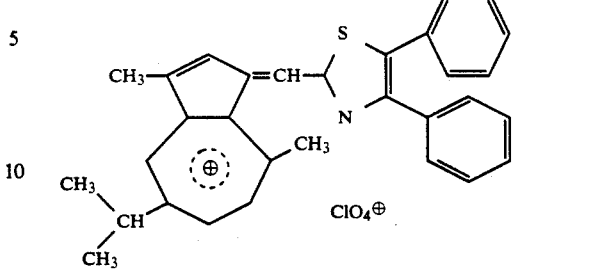
3-37
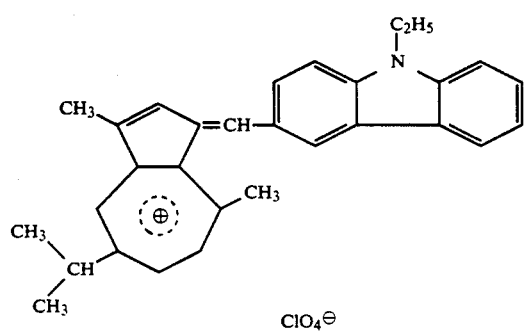
3-40
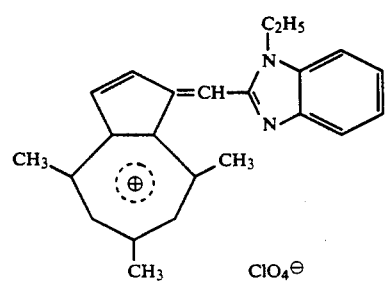
3-38
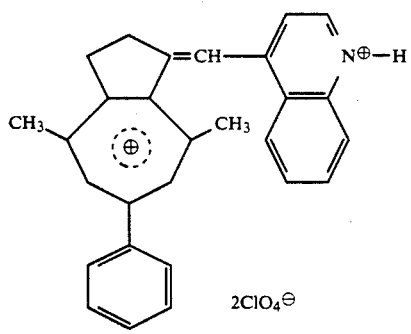
The examples of compounds represented by the foregoing general formula (3-9).
3-41
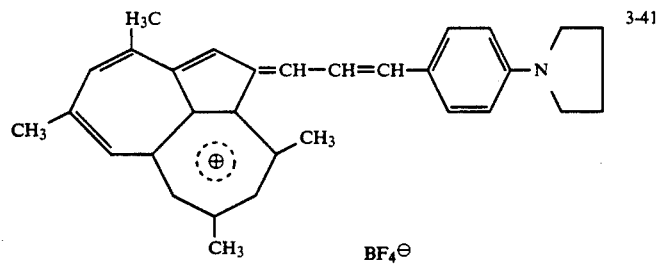
3-42
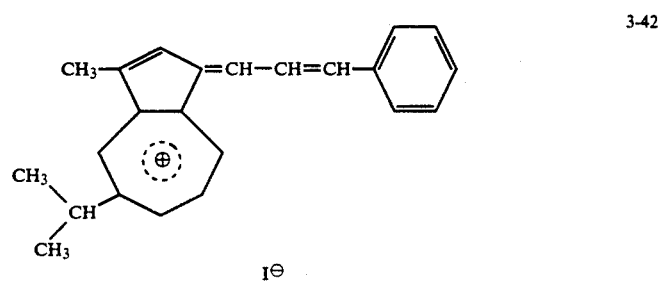

-continued
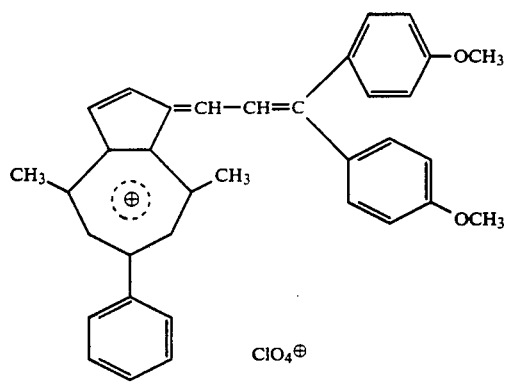
3-43
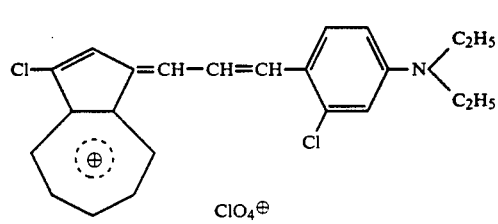
3-44
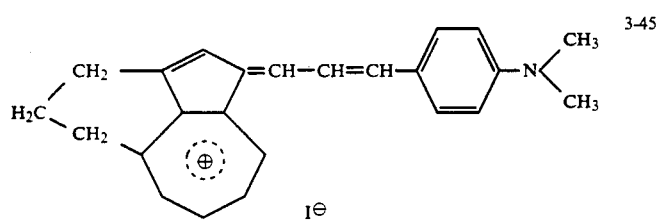
3-45
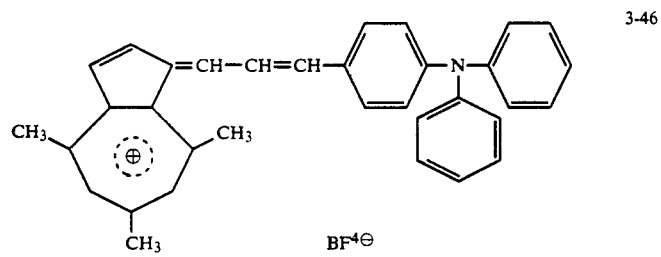
3-46
The examples of compounds represented by the foregoing general formula (3-10).
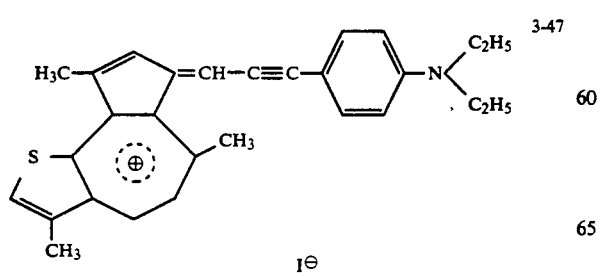
3-47
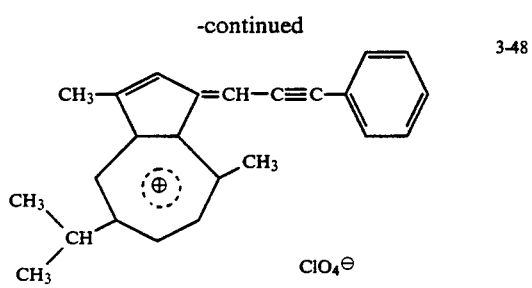
3-48

-continued

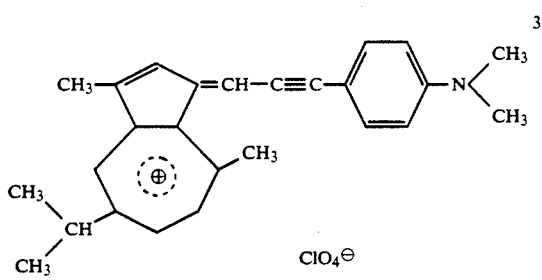

3-49

The examples of compounds represented by the foregoing general formula (3-11).

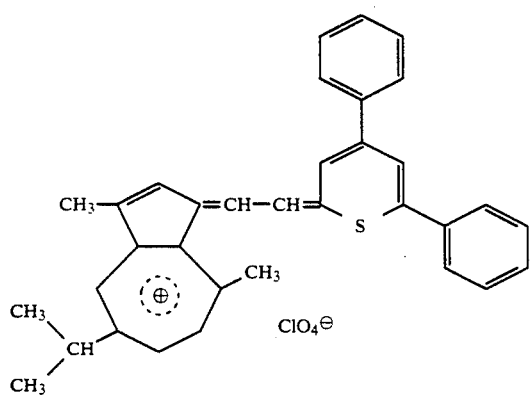

3-50

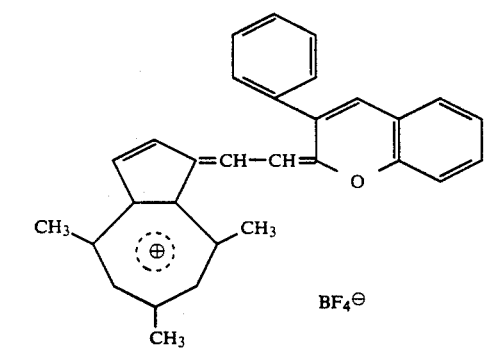

3-51

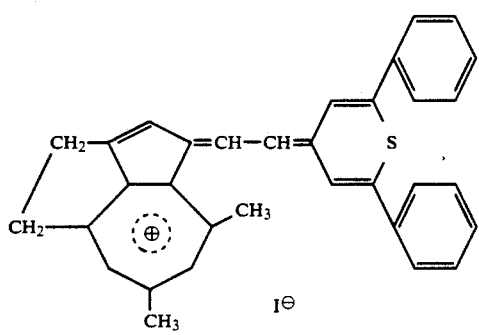

3-52

-continued

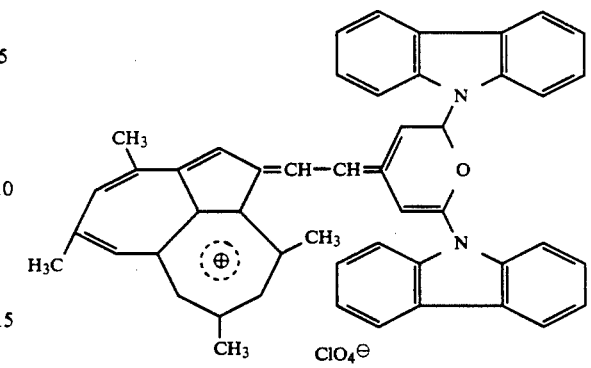

3-53

The compounds represented by the formulae (3-1) and (3-2) can be easily obtained by allowing an azulene compound to react with a squaric acid or croconic acid in an appropriate solvent as described in Angewandte Chemie Vol. 78, No. 20, p. 937 (1966).

As for the compounds represented by the formula (3-3), the compound with n=0 can be obtained by heating a 1-formyl-azulene compound and an azulene compound as described in Journal of the Chemical Society, P. 501, 1960 in an appropriate solvent in the presence of a strong acid, or by mixing an 1-ethoxymethylene-azulenium salt compound and an azulene compound in an appropriate solvent as described in Journal of the Chemical Society, P. 1724–P. 1730, 1961, or by heating a 2-hydroxymethylenecyclohexanone and an azulene compound in an appropriate solvent in the presence of a strong acid as described in Journal of the Chemical Society, P. 359, 1961. In the formula (3-3), the compound with $n_{3-1}=1$ or $n_{3-1}=2$ can be obtained by mixing an azulene compound and a malondialdehyde or a glutacondialdehyde in an appropriate solvent in the presence of a strong acid as described in Journal of the Chemical Society, P. 3591–P. 3592, 1961.

The compound represented by the formula (3-4) can be obtained easily by heating an azulene compound and glyoxal in an appropriate solvent in the presence of a strong acid as described in Journal of the Chemical Society, P. 3588, 1961.

The compound represented by the formula (3-5) can be obtained by heating a 1,3-diformylazulene compound and an azulene compound in an appropriate solvent in the presence of a strong acid as described in Journal of the Chemical Society, P. 501, 1960.

The compounds represented by the formula (3-6) can be obtained by heating a 1-formylazulene compound and a heterocyclic quaternary ammonium salt compound having an active methyl group in an appropriate solvent as described in Journal of the Chemical Society, P. 163–P. 167, 1961.

The compounds represented by the formulae (3-7), (3-8), (3-9) and (3-10) can be obtained by mixing an azulene compound and a corresponding aldehyde compound in an appropriate solvent in the presence of a strong acid, as described in Journal of the Chemical Society, P. 1100–P. 1117, 1958; Journal of the Chemical Society, P. 494–P. 501, 1960; and Journal of the Chemical Society, P. 3579–P. 3593, 1961.

The compound represented by the formula (3-11) can be obtained by allowing a 1-formyl-azulene compound to react with a compound represented by the formula (3-12) in a solvent.
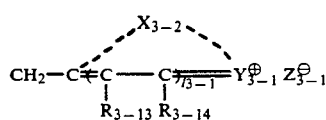
Formula (3-12)
wherein $X_{3-2}$, $Y_{3-1}$, $R_{3-13}$, $R_{3-14}$, $Z_{3-1}^{\ominus}$ and $l_{3-1}$ have the same meanings as defined above.
Mentioned below are the examples of compounds represented by the foregoing general formula (4-I)
| Compound No. | Examples |
|---|---|
| 4-1 | |
| 4-2 | |
| 4-3 | |
| 4-4 | |
| 4-5 | |

-continued
| Compound No. | Examples |
|---|---|
| 4-6 | 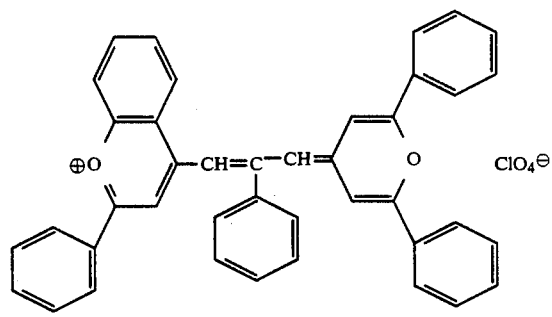 |
| 4-7 | 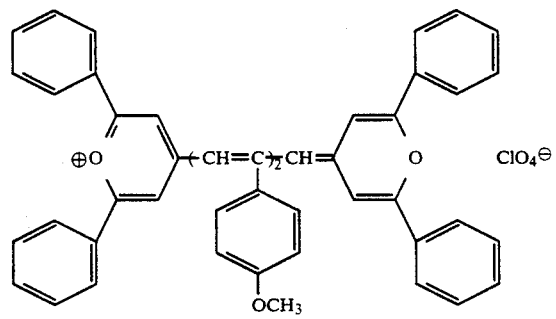 |
| 4-8 | 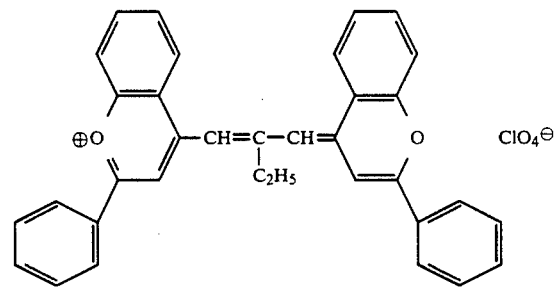 |
| 4-9 | 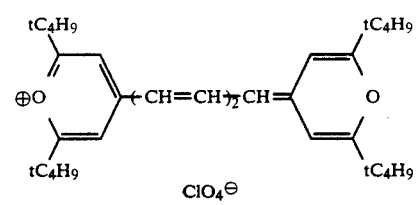 |
| 4-10 | 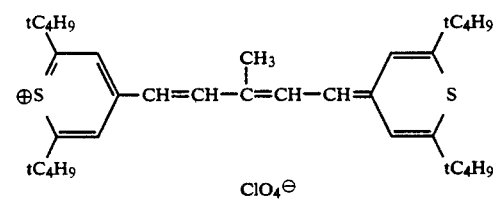 |
| 4-11 | 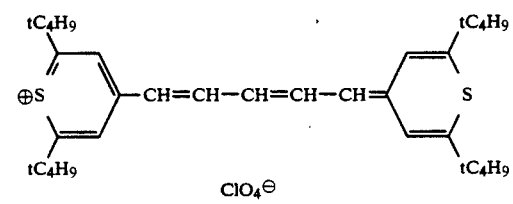 |

| Compound No. | Examples |
|---|---|
| 4-12 | 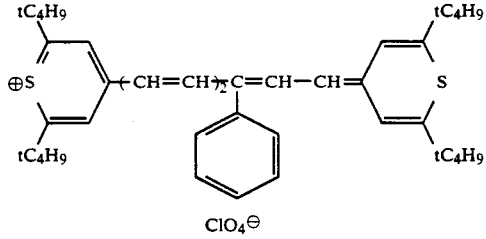 |
| 4-13 | 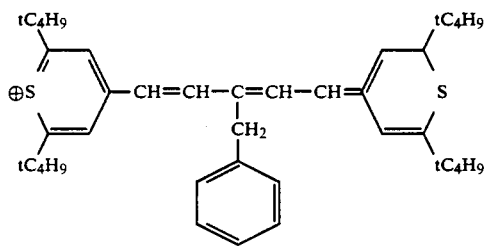 |
| 4-14 | 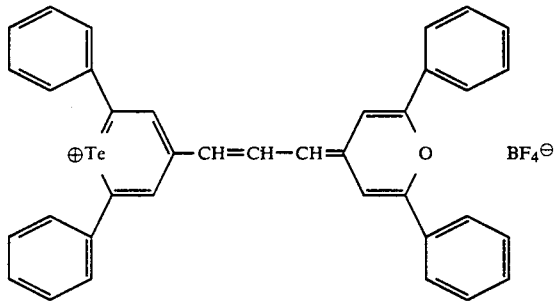 |
| 4-15 | 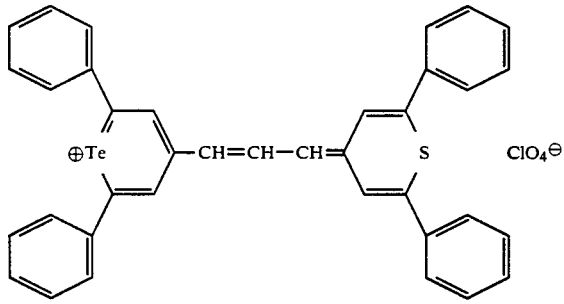 |
| 4-16 | 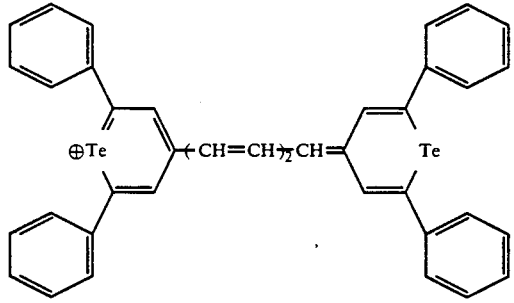 |
The examples of compounds represented by the foregoing general formula (4-II)

| Compound No. | Example |
|---|---|
| 4-17 | 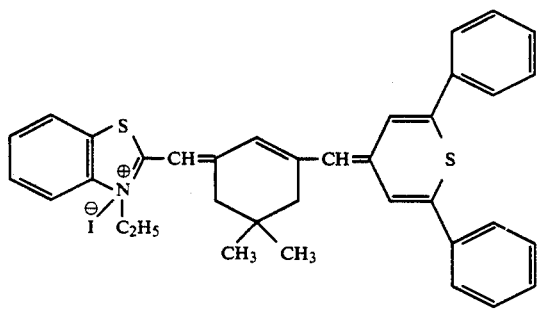 |
| 4-18 | 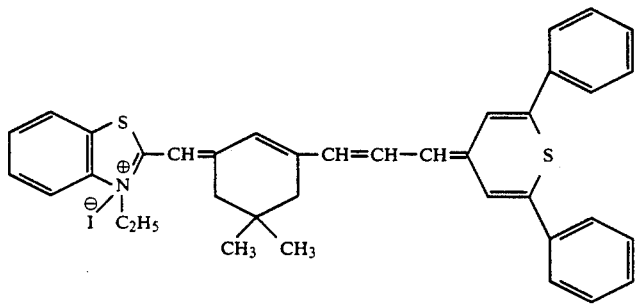 |
| 4-19 | 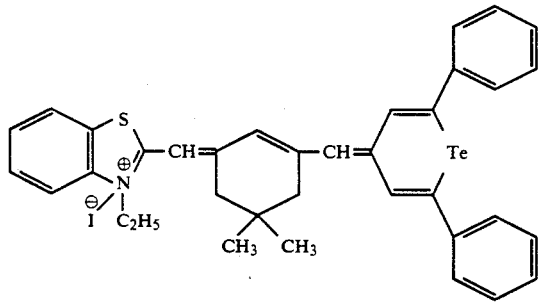 |
| 4-20 | 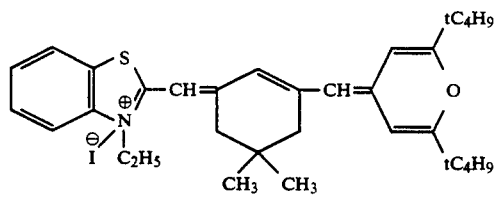 |
| 4-21 | 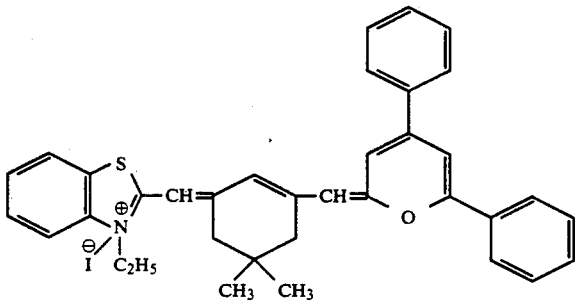 |

| Compound No. | Example |
|---|---|
| 4-22 | 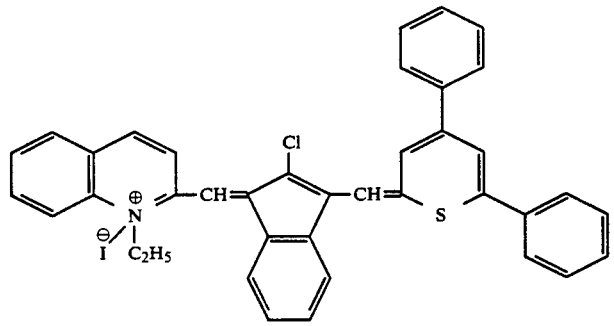 |
| 4-23 | 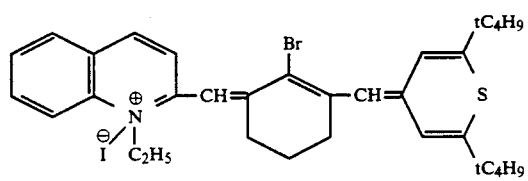 |
| 4-24 | 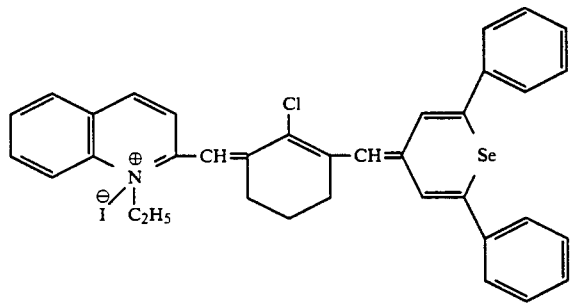 |
The examples of compounds represented by the foregoing general formula (4-III)
| Compound No. | Examples |
|---|---|
| 4-25 | 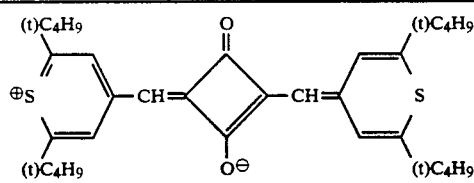 |
| 4-26 | 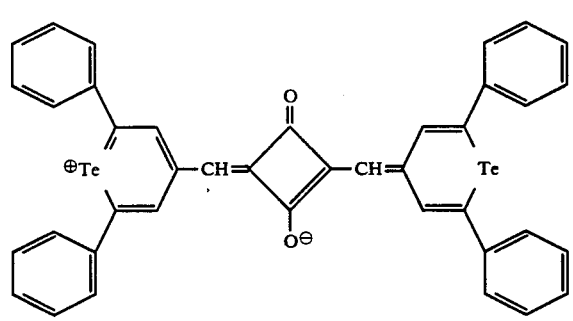 |

-continued
| Compound No. | Examples |
|---|---|
| 4-27 | 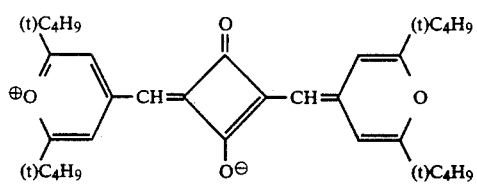 |
| 4-28 | 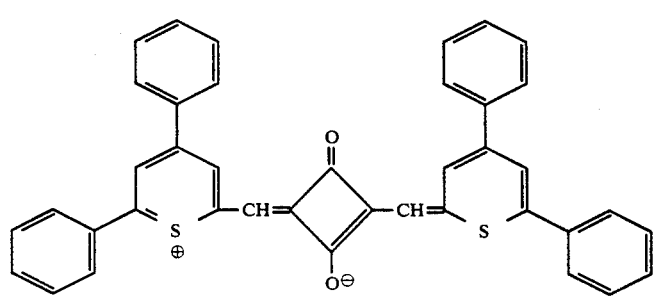 |
| 4-29 | 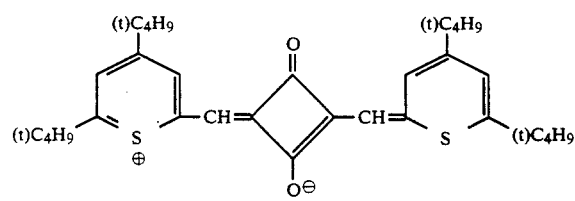 |
| 4-30 | 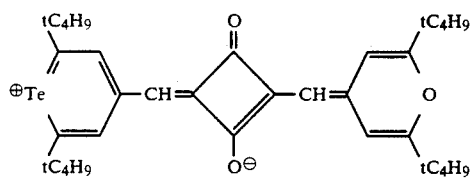 |
| 4-31 | 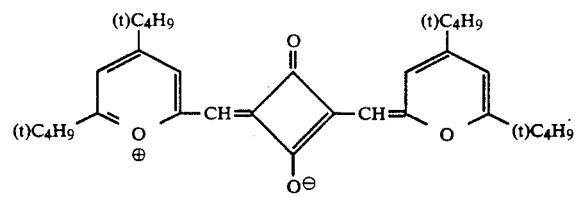 |
| 4-32 | 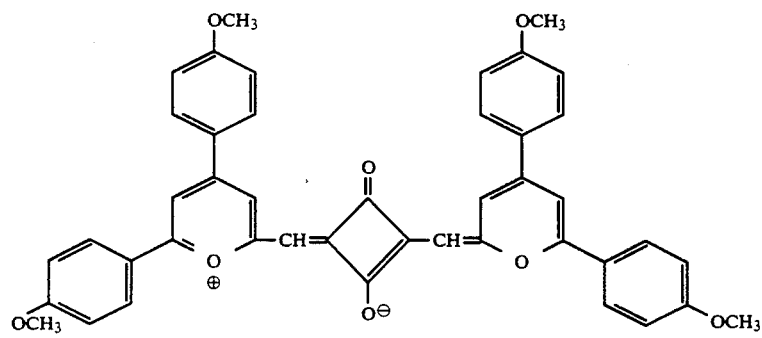 |

| Compound No. | Examples |
|---|---|
| 4-33 | (structure) |
| 4-34 | (structure) |
| 4-35 | (structure) |
| 4-36 | (structure) |
| 4-37 | (structure) |
| 4-38 | (structure) |
| 4-39 | (structure) |

| Compound No. | Examples |
|---|---|
| 4-40 | (structure) |

The examples of compounds represented by the foregoing general formula (4-IV)

| Compound No. | Examples |
|---|---|
| 4-41 | (structure with Cl, OCH₃, ClO₄⁻) |
| 4-42 | (structure with (CH$_2$)$_9$CH$_3$, OCH$_3$, ClO$_4^-$) |
| 4-43 | (structure with CH$_2$–CH(CH$_3$)$_2$, OCH$_3$, ClO$_4^-$) |
| 4-44 | (structure with (CH$_2$)$_7$CH$_3$, OCH$_3$, ClO$_4^-$) |
| 4-45 | (structure with tC$_4$H$_9$, N(C$_2$H$_5$)$_2$, ClO$_4^-$) |
| 4-46 | (structure with tC$_4$H$_9$, N(CH$_3$)$_2$, ClO$_4^-$) |

| Compound No: | Examples |
|---|---|
| 4-47 | 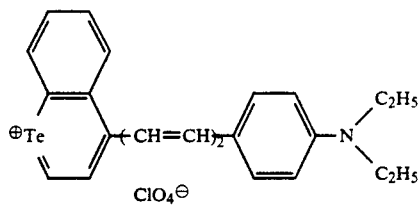 |
| 4-48 | 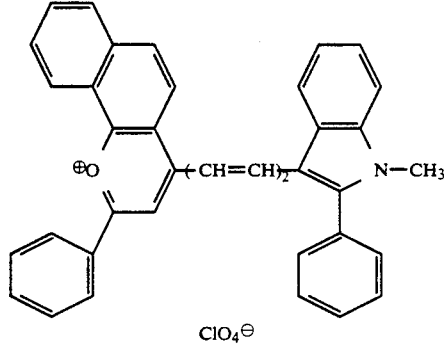 |
| 4-49 | 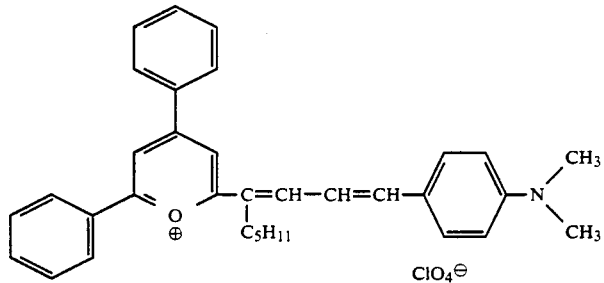 |
| 4-50 | 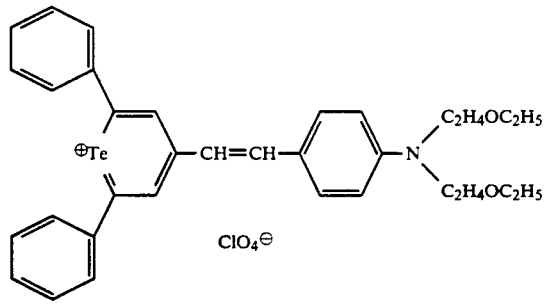 |
| 4-51 | 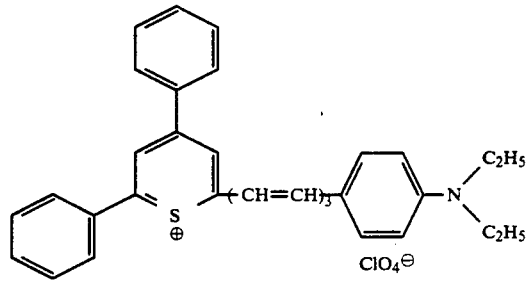 |

-continued
| Compound No. | Examples |
|---|---|
| 4-52 | 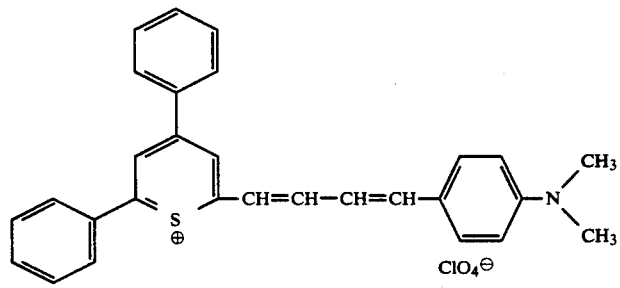 |
| 4-53 | 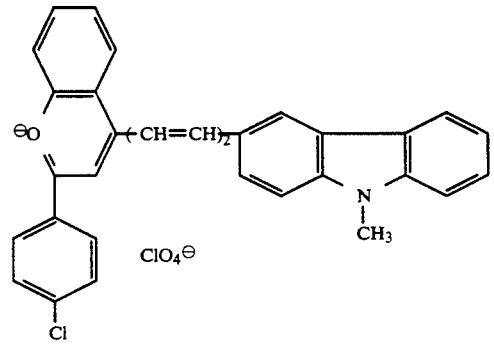 |
| 4-54 | 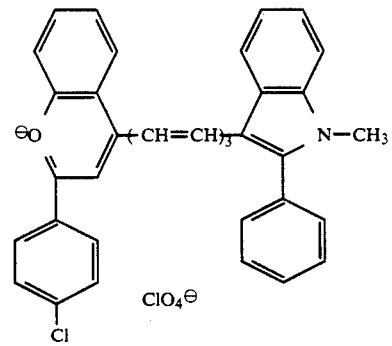 |
| 4-55 | 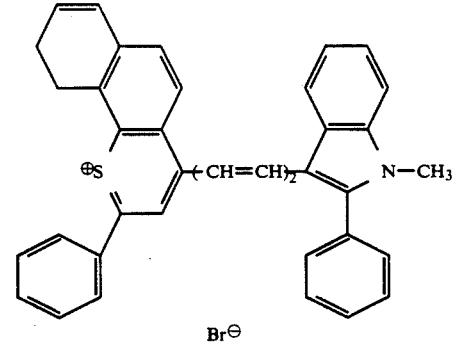 |
| 4-56 | 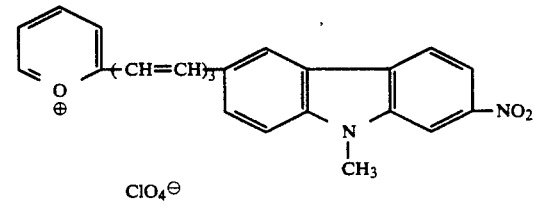 |

-continued
| Compound No. | Examples |
|---|---|
| 4-57 | 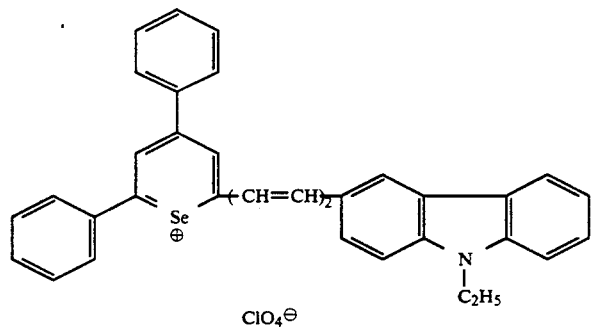 |
| 4-58 | 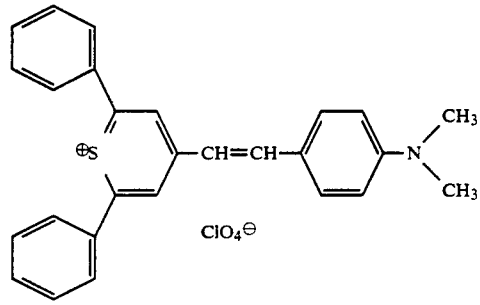 |
| 4-59 | 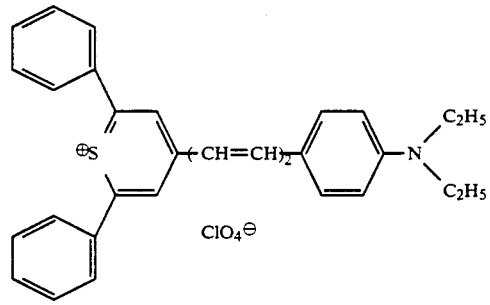 |
| 4-60 | 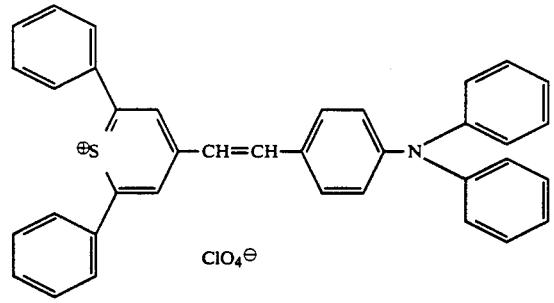 |
| 4-61 | 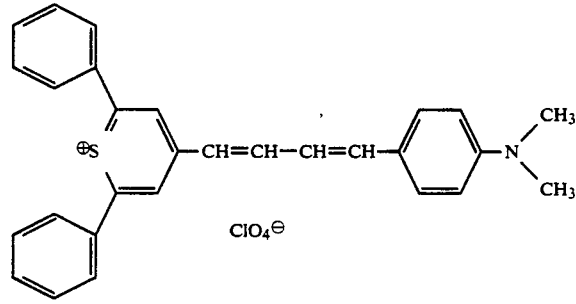 |

-continued
| Compound No. | Examples |
|---|---|
| 4-62 | 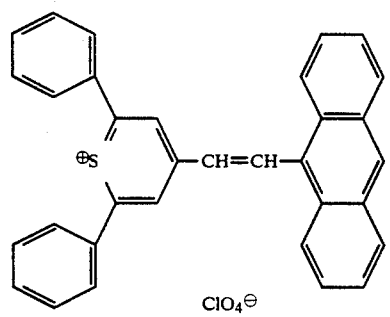 |
| 4-63 | 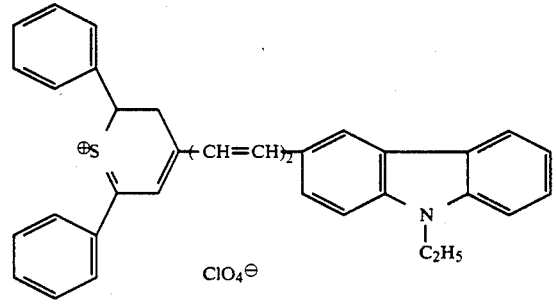 |
| 4-64 | 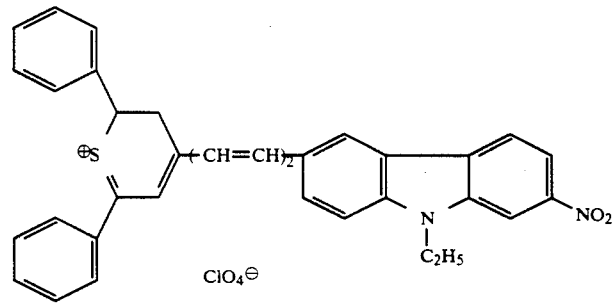 |
| 4-65 | 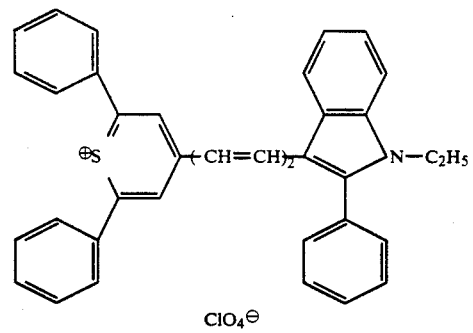 |
| 4-66 | 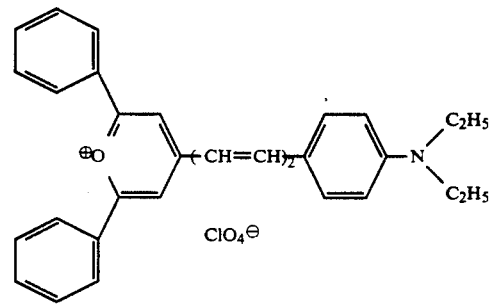 |

-continued

| Compound No. | Examples |
|---|---|
| 4-67 | 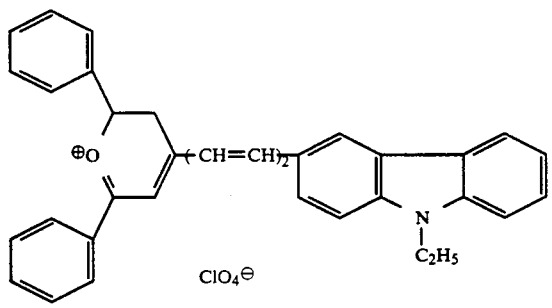 |
| 4-68 | 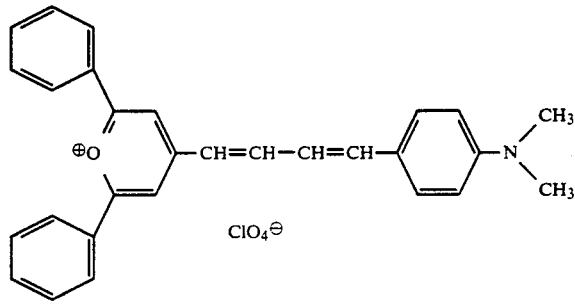 |
| 4-69 | 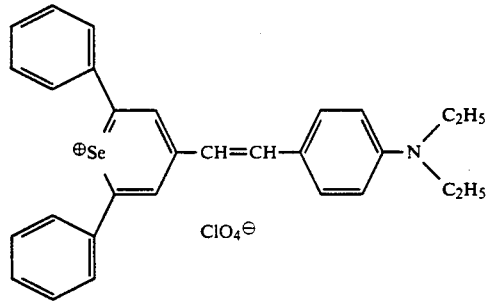 |
| 4-70 | 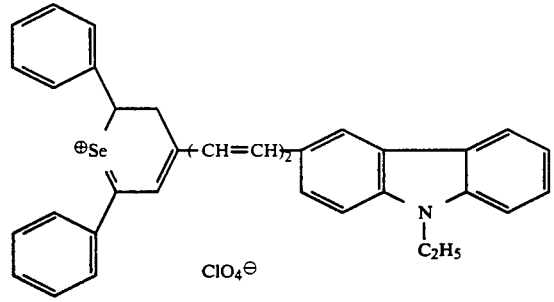 |
| 4-71 | 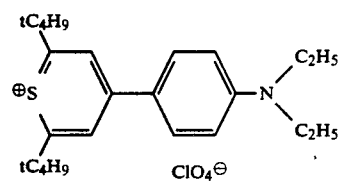 |

Also, for formation of a recording layer, in addition to the coloring matter and the chelate compound, a binder may be mixed therein. Suitable binder may be selected from a wide scope of resins. Specific examples may include cellulose esters such as nitrocellulose, cellulose phosphate, cellulose sulfate, cellulose acetate, cellulose propionate, cellulose butyrate, cellulose myristate, cellulose palmitate, cellulose acetate propionate, cellulose acetate butyrate, etc.; cellulose ethers such as methyl cellulose, ethyl cellulose, propyl cellulose, butyl cellulose, etc.; vinyl resins such as polystyrene, polyvinyl chloride, polyvinyl acetate, polyvinyl butyral, polyvinyl acetal, polyvinyl alcohol, polyvinyl pyrrolidone, etc.; copolymer resins such as styrene-butadiene copolymer, styrene-acrylonitrile copolymer, styrene-butadiene-acrylonitrile copolymer, vinyl chloride-vinyl acetate copolymer, etc.; acrylic resins such as polymethyl methacrylate, polymethyl acrylate, polybutyl acrylate, polyacrylic acid, polymethacrylic acid, polyacrylamide, polyacrylonitrile, etc.; polyesters such as polyethylene terephthalate, polyarylate resins such as poly(4,4'-isopropylidene, diphenylene-co-1,4-cyclohexylene-dimethylenecarbonate), poly(ethylenedioxy-3,3'-phenylenethiocarbonate), poly(4,4'-isopropylidenediphenylenecarbonate-co-terephthalate), poly(4,4'-isopropylidenediphenylenecarbonate), poly(4,4'-sec-butylidenediphenylenecarbonate), poly(4,4'-isopropylidenediphenylenecarbonate-block-oxyethylene), etc.; or polyamides; polyimides; epoxy resins; phenol resins; polyolefins such as polyethylene, polypropylene, chlorinated polyethylene, etc.

The organic solvent which can be used during coating may depend on whether the coating is made under dispersed state or amorphous state, but there can be generally employed alcohols such as methanol, ethanol, isopropanol and the like; ketones such as acetone, methyl ethyl ketone, cyclohexanone and the like; amides such as N,N-dimethylformamide, N,N-dimethylacetamide and the like; sulfoxides such as dimethyl sulfoxide; ethers such as tetrahydrofuran, dioxane, ethylene glycol monomethyl ether; esters such as methyl acetate, ethyl acetate, butyl acetate and the like; aliphatic halogenated hydrocarbons such as chloroform, methylene chloride, dichloroethylene, carbon tetrachloride, trichloroethylene, etc.; or aromatics such as benzene, toluene, xylene, monochlorobenzene, dichlorobenzene, anisole, and so on.

Coating can be practiced by use of dip coating, spray coating, spinner coating, bead coating, Meyer bar coating, blade coating, roller coating, curtain coating and other methods.

As the substrate, glass, polyamide, polyester, polyolefin, polycarbonate, epoxy, polyimide, polymethyl methacrylate, etc. may be used. The substrate has usually grooves for tracking thereon, and may further have a subbing layer for improvement of adhesion to the recording layer or improvement of solvent resistance thereon.

According to the present invention, it is possible to obtain an optical information recording medium with enhanced reflectance, application of stable tracking, which can obtain a high C/N ratio and good storage stability.

EXAMPLES 1-1 to 1-12

On an acrylic disc substrate with a diameter of 130 mm and an inner diameter of 15 mm, a subbing layer (100–200 Å) comprising $SiO_2$ was formed, and then a material comprising a combination of a coloring matter and a metal chelate compound as shown in Table 1-1 (infra) was formed into a recording layer with a film thickness of 800 to 1000 Å by use of a predetermined solvent.

From the substrate side of the recording medium thus obtained, writing and reading were performed by use of a semiconductor laser beam of 830 nm at a recording frequency of 2MHz, a rotational number of 1800 rpm, a recording power of 8 mW and a reading power of 0.6 mW, and the reading waveform was analyzed by spectrum analysis to measure a C/N value.

Next, the same recording medium was left to stand under the conditions of 60° C. and 90% RH for 1000 hours to perform the storage acceleration test, and the reflectance and C/N value were measured. The results are shown in Table 1-2(infra).

EXAMPLES 2-1 to 2-11

On an acrylic disc substrate with a diameter of 130 mm and an inner diameter of 15 mm, a subbing layer (100 Å) comprising $SiO_2$ was formed, and then a material comprising a combination of a coloring matter and a metal chelate compound as shown in Table 2-1(infra) was formed into a recording layer with a film thickness of 800 to 1000 Å by use of a predetermined solvent.

From the substrate side of the recording medium thus obtained, writing and reading were performed by use of a semiconductor laser beam of 830 nm at a recording frequency of 2 MHz, a rotational number of 1800 rpm, a recording power of 8 mW and a reading power of 0.6 mW, and the reading waveform was analyzed by spectrum analysis to measure a C/N value.

Next, the same recording medium was left to stand under the conditions of 60° C. and 90% RH for 1000 hours to perform the storage acceleration test, and the reflectance and C/N value were measured. The results are shown in Table 2-2(infra).

COMPARATIVE EXAMPLES 2-1 to 2-3

By use of the same coloring matters as Examples 2-2, 2-4 and 2-10, and without use of any metal chelate compound, recording layers were formed according to the same method as in Example 2-1, and the tests were conducted similarly as in Example 2-1. The results obtained are also shown in Table 2-1 and Table 2-2(infra).

EXAMPLES 3-1 to 3-11

On an acrylic disc substrate with a diameter of 130 mm and an inner diameter of 15 mm, a material comprising a combination of a coloring matter and a metal chelate compound as shown in Table 3-1(infra) was formed into a recording layer with a film thickness of 800 to 1000 Å by use of a predetermined solvent.

From the substrate side of the recording medium thus obtained, writing and reading were performed by use of a semiconductor laser beam of 830 nm at a recording frequency of 2 MHz, a rotational number of 1800 rpm, a recording power of 7 mW and a reading power of 0.7 mW, and the reading waveform was analyzed by spectrum analysis to measure a C/N value.

Next, the same recording medium was left to stand under the conditions of 60° C. and 90% RH for 1000 hours to perform the storage acceleration test, and the reflectance and C/N value were measured. The results are shown in Table 3-2(infra).

COMPARATIVE EXAMPLES 3-1 to 3-3

By use of the same coloring matters as Examples 3-1, 3-3 and 3-9, and without use of any metal chelate compound, recording layers were formed according to the same method as in Example 3-1, and the tests were conducted similarly as in Example 3-1. The results obtained are also shown in Table 3-1 and Table 3-2(infra).

EXAMPLES 4-1 to 4-10

On an acrylic disc substrate with a diameter of 130 mm and an inner diameter of 15 mm, a material comprising a combination of a pyrylium compound and a metal chelate compound as shown in Table 4-1 (infra) was formed into a recording layer with a film thickness of 800 to 1000 Å by use of a predetermined solvent.

From the substrate side of the recording medium thus obtained, writing and reading were performed by use of a semiconductor laser beam of 830 nm at a recording frequency of 2 MHz, a rotational number of 1800 rpm, a recording power of 8 mW and a reading power of 0.6 mW, and the reading waveform was analyzed by spectrum analysis to measure a C/N value.

Next, the same recording medium was left to stand under the conditions of 60° C. and 90% RH for 1000 hours to perform the storage acceleration test, and the reflectance and C/N value were measured. The results are shown in Table 4-2(infra).

COMPARATIVE EXAMPLES 4-1 TO 4-3

By use of the same pyrylium compound as Examples 4-3, 4-6 and 4-8, and without use of any metal chelate compound, recording layers were formed according to the same method as in Example 4-1, and the tests were conducted similarly as in Example 4-1. The results obtained are also shown in Table 4-1 and Table 4-2(infra).

TABLE 1-1

| No. | Coloring matter (wt %) | Metal chelate compound (wt %) |
|---|---|---|
| Example | | |
| 1-1 | 1-1 (85%) | M-4-5 (10%) |
|  |  | M-16-1 (5%) |
| 1-2 | 1-1 (90%) | M-7-3 (10%) |
| 1-3 | 1-7 (95%) | M-1-6 (5%) |
| 1-4 | 1-7 (85%) | M-8-12 (10%) |
|  |  | M-10-2 (5%) |
| 1-5 | 1-8 (95%) | M-7-2 (5%) |
| 1-6 | 1-8 (90%) | M-14-7 (10%) |
| 1-7 | 1-9 (95%) | M-4-4 (5%) |
| 1-8 | 1-10 (50%) | M-7-7 (50%) |
| 1-9 | 1-11 (90%) | M-8-6 (10%) |
| 1-10 | 1-13 (85%) | M-9-3 (15%) |
| 1-11 | 1-13 (75%) | M-15-3 (15%) |
|  |  | M-2-8 (10%) |
| 1-12 | 1-16 (80%) | M-3-9 (20%) |
| Comparative Example | | |
| 1-1 | 1-1 | |
| 1-2 | 1-16 | |

TABLE 1-2

| No. | Initial reflectance (%) | Initial C/N value (dB) | Reflectance after acceleration test (%) | C/N value after acceleration test (dB) |
|---|---|---|---|---|
| Example | | | | |
| 1-1 | 23.2 | 52 | 22.9 | 51 |
| 1-2 | 23.4 | 54 | 22.5 | 52 |
| 1-3 | 22.6 | 51 | 21.6 | 49 |
| 1-4 | 21.5 | 49 | 20.7 | 48 |
| 1-5 | 19.8 | 47 | 19.2 | 46 |
| 1-6 | 19.5 | 47 | 19.0 | 46 |
| 1-7 | 22.7 | 50 | 21.2 | 48 |
| 1-8 | 21.6 | 51 | 22.3 | 50 |
| 1-9 | 22.3 | 52 | 20.9 | 50 |
| 1-10 | 21.9 | 49 | 21.0 | 46 |
| 1-11 | 24.5 | 51 | 22.7 | 50 |
| 1-12 | 24.1 | 54 | 23.4 | 52 |
| Comparative Example | | | | |
| 1-1 | 16.8 | 47 | 14.5 | 39 |
| 1-2 | 18.6 | 50 | 15.8 | 35 |

TABLE 2-1

| | Coloring matter | | Metal chelate compound | |
|---|---|---|---|---|
| | No. | Amount (wt %) | No. | Amount (wt %) |
| Ex. | | | | |
| 2-1 | 2-2 | 80 | M-5-3 | 20 |
| 2-2 | 2-4 | 90 | M-7-3 | 3 |
|  |  |  | M-7-7 | 7 |
| 2-3 | 2-8 | 90 | M-4-5 | 10 |
| 2-4 | 2-14 | 60 | M-3-9 | 30 |
|  |  |  | M-16-1 | 10 |
| 2-5 | 2-16 | 90 | M-10-2 | 10 |
| 2-6 | 2-19 | 75 | M-8-5 | 25 |
| 2-7 | 2-21 | 90 | M-3-6 | 10 |
| 2-8 | 2-23 | 80 | M-11-3 | 20 |
| 2-9 | 2-26 | 70 | M-15-3 | 20 |
|  |  |  | M-13-3 | 10 |
| 2-10 | 2-27 | 85 | M-14-7 | 15 |
| 2-11 | 2-34 | 90 | M-7-7 | 10 |
| Comp. Ex. | | | | |
| 2-1 | 2-4 | 100 | — | — |
| 2-2 | 2-14 | 100 | — | — |
| 2-3 | 2-27 | 100 | — | — |

TABLE 2-2

| | Initial | | Storage property after acceleration test | |
|---|---|---|---|---|
| | Reflectance (%) | C/N value (dB) | Reflectance (%) | C/N value (dB) |
| Ex. | | | | |
| 2-1 | 19.8 | 50 | 17.9 | 48 |
| 2-2 | 20.2 | 51 | 19.4 | 49 |
| 2-3 | 21.0 | 51 | 18.6 | 49 |
| 2-4 | 20.6 | 52 | 19.4 | 50 |
| 2-5 | 19.8 | 50 | 18.0 | 48 |
| 2-6 | 21.1 | 51 | 19.7 | 49 |
| 2-7 | 19.5 | 51 | 18.3 | 50 |
| 2-8 | 20.7 | 49 | 19.4 | 47 |
| 2-9 | 19.9 | 53 | 18.1 | 50 |
| 2-10 | 20.3 | 53 | 18.5 | 50 |
| 2-11 | 20.8 | 53 | 19.5 | 52 |
| Comp. Ex. | | | | |
| 2-1 | 17.2 | 46 | 15.4 | 38 |
| 2-2 | 18.0 | 50 | 14.5 | 40 |
| 2-3 | 19.1 | 52 | 16.0 | 40 |

TABLE 3-1

| | Coloring matter | | Metal chelate compound | |
|---|---|---|---|---|
| | No. | Amount (wt %) | No. | Amount (wt %) |
| Ex. | | | | |
| 3-1 | 3-1 | 85 | M-15-4 | 15 |
| 3-2 | 3-1 | 80 | M-16-1 | 20 |
| 3-3 | 3-2 | 80 | M-7-7 | 15 |
|  |  |  | M-4-2 | 5 |
| 3-4 | 3-2 | 85 | M-5-2 | 15 |
| 3-5 | 3-4 | 90 | M-8-5 | 10 |
| 3-6 | 3-5 | 75 | M-4-5 | 15 |
|  |  |  | M-10-2 | 10 |
| 3-7 | 3-6 | 95 | M-7-3 | 5 |
| 3-8 | 3-13 | 70 | M-13-3 | 30 |
| 3-9 | 3-14 | 60 | M-7-7 | 25 |
|  |  |  | M-15-2 | 15 |
| 3-10 | 3-14 | 90 | M-3-8 | 10 |
| 3-11 | 3-17 | 90 | M-12-2 | 10 |

TABLE 3-1-continued

| | Coloring matter | | Metal chelate compound | |
|---|---|---|---|---|
| | No. | Amount (wt %) | No. | Amount (wt %) |
| Comp. Ex. | | | | |
| 3-1 | 3-1 | 100 | — | — |
| 3-2 | 3-2 | 100 | — | — |
| 3-3 | 3-14 | 100 | — | — |

TABLE 3-2

| | Initial | | Storage property after acceleration test | |
|---|---|---|---|---|
| | Reflectance (%) | C/N value (dB) | Reflectance (%) | C/N value (dB) |
| Ex. | | | | |
| 3-1 | 23.4 | 51 | 22.9 | 50 |
| 3-2 | 24.0 | 52 | 23.2 | 50 |
| 3-3 | 24.1 | 51 | 23.7 | 50 |
| 3-4 | 23.0 | 51 | 21.5 | 49 |
| 3-5 | 21.5 | 49 | 20.9 | 47 |
| 3-6 | 23.9 | 49 | 22.1 | 46 |
| 3-7 | 24.2 | 50 | 23.3 | 48 |
| 3-8 | 22.6 | 48 | 21.8 | 46 |
| 3-9 | 23.7 | 48 | 23.0 | 47 |
| 3-10 | 22.8 | 47 | 20.8 | 45 |
| 3-11 | 21.6 | 46 | 20.2 | 42 |
| Comp. Ex. | | | | |
| 3-1 | 22.5 | 49 | 16.1 | 19 (noise level rises) |
| 3-2 | 22.1 | 50 | 18.5 | 21 (noise level rises) |
| 3-3 | 21.0 | 46 | 17.8 | 16 (noise level rises) |

TABLE 4-1

| | Pyrilium compound | | Metal chelate compound | |
|---|---|---|---|---|
| | No. | Amount (wt %) | No. | Amount (wt %) |
| Ex. | | | | |
| 4-1 | 4-2 | 70 | M-8-5 | 30 |
| 4-2 | 4-9 | 90 | M-16-1 | 10 |
| 4-3 | 4-15 | 90 | M-3-6 | 10 |
| 4-4 | 4-21 | 80 | M-10-2 | 20 |
| 4-5 | 4-25 | 90 | M-7-7 | 10 |
| 4-6 | 4-29 | 80 | M-14-7 | 20 |
| 4-7 | 4-35 | 90 | M-3-9 | 10 |
| 4-8 | 4-50 | 90 | M-7-3 | 10 |
| 4-9 | 4-52 | 80 | M-14-7 | 20 |
| 4-10 | 4-69 | 80 | M-13-3 | 20 |
| Comp. Ex. | | | | |
| 4-1 | 4-15 | 100 | — | — |
| 4-2 | 4-20 | 100 | — | — |
| 4-3 | 4-50 | 100 | — | — |

TABLE 4-2

| | Initial | | Storage property after acceleration test | |
|---|---|---|---|---|
| | Reflectance (%) | C/N value (dB) | Reflectance (%) | C/N value (dB) |
| Ex. | | | | |
| 4-1 | 25.5 | 48 | 24.0 | 46 |
| 4-2 | 23.7 | 48 | 21.6 | 46 |
| 4-3 | 24.1 | 47 | 23.3 | 46 |
| 4-4 | 23.5 | 47 | 22.0 | 46 |
| 4-5 | 24.5 | 48 | 22.7 | 47 |
| 4-6 | 25.9 | 49 | 24.5 | 47 |
| 4-7 | 23.8 | 47 | 22.5 | 46 |
| 4-8 | 26.0 | 51 | 24.7 | 50 |
| 4-9 | 25.5 | 51 | 24.2 | 50 |
| 4-10 | 23.8 | 48 | 21.6 | 46 |
| Comp. Ex. | | | | |
| 4-1 | 22.9 | 46 | 19.8 | 41 |

TABLE 4-2-continued

| | Initial | | Storage property after acceleration test | |
|---|---|---|---|---|
| | Reflectance (%) | C/N value (dB) | Reflectance (%) | C/N value (dB) |
| 4-2 | 25.0 | 48 | 21.0 | 42 |
| 4-3 | 24.3 | 47 | 19.0 | 39 |

What is claimed is:

1. A thermal optical information recording medium capable of having information recorded thereon by a laser beam in the form of optically detectable pits, said recording medium comprising a recording material, which comprises (i) at least one compound selected from the group consisting of general formulae (1-I) to (3-III) shown below and pyrylium compounds, and (ii) a nonionic metal chelate compound:

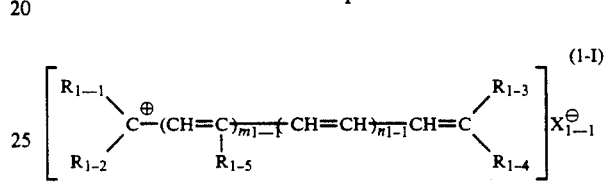

(1-I)

wherein $R_{1-1}$, $R_{1-2}$, $R_{1-3}$, $R_{1-4}$ and $R_{1-5}$ each represent hydrogen, alkyl, substituted alkyl, cyclic alkyl, alkenyl, aralkyl, substituted aralkyl, aryl, cyclic alkyl, alkenyl, aralkyl, substituted aralkyl, aryl, substituted aryl, styryl, substituted styryl, heterocyclic ring or substituted heterocyclic ring; $m_{1-1}$ is 0 or 1, $n_{1-1}$ is 0, 1 or 2; and $X_{1-1}^{\ominus}$ is an anion,

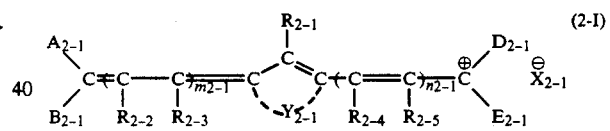

(2-I)

wherein $A_{2-1}$, $B_{2-1}$, $D_{2-1}$ and $E_{2-1}$ each represent hydrogen atom, alkyl, alkenyl, substituted or unsubstituted aralkyl, substituted or unsubstituted aryl; $Y_{2-1}$ represents a divalent residue having a group of atoms necessary for the completion of a 5- or 6-membered ring; $R_{2-1}$, $R_{2-2}$, $R_{2-3}$, $R_{2-4}$ and $R_{2-5}$ each represent hydrogen atom, halogen atom or alkyl; $X_{2-1}^{\ominus}$ represents an anion; $m_{2-1}$ and $n_{2-1}$ each represent 0, 1 or 2,

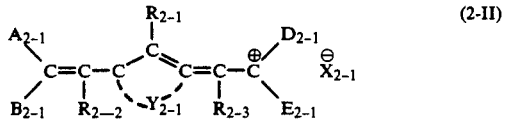

(2-II)

wherein $A_{2-1}$, $B_{2-1}$, $D_{2-1}$ and $E_{2-1}$ each represent hydrogen atom, alkyl, alkenyl, substituted or unsubstituted aralkyl, substituted or unsubstituted aryl; $Y_{2-1}$ represents a divalent residue having a group of atoms necessary for the completion of a 5- or 6-membered ring; $R_{2-1}$, $R_{2-2}$ and $R_{2-3}$ each represent hydrogen atom, halogen atom or alkyl; $X_{2-1}^{\ominus}$ represents an anion,

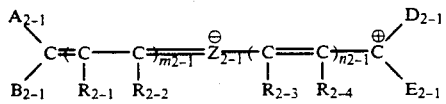 (2-III)

wherein $Z_{2-1}^{\ominus}$ represents

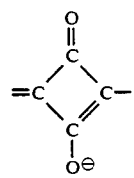

or

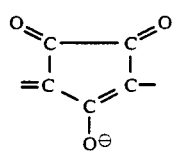

$A_{2-1}$, $B_{2-1}$, $D_{2-1}$ and $E_{2-1}$ each represent hydrogen atom, alkyl, alkenyl, substituted or unsubstituted aralkyl, substituted or unsubstituted aryl; $R_{2-1}$, $R_{2-2}$, $R_{2-3}$ and $R_{2-4}$ each represent hydrogen atom, halogen atom or alkyl; $m_{2-1}$ and $n_{2-1}$ each represent 0, 1 or 2,

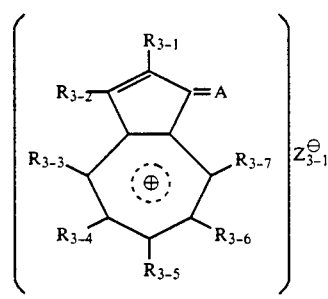 (3-I)

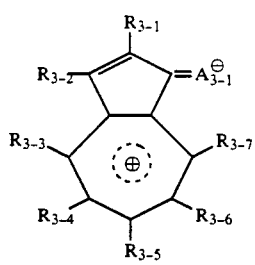 (3-II)

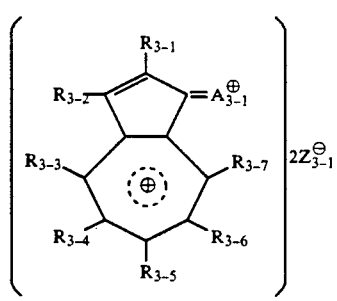 (3-III)

(in the general formulae, and, $R_{3-1}$, $R_{3-2}$, $R_{3-3}$, $R_{3-4}$, $R_{3-5}$, $R_{3-6}$ and $R_{3-7}$ each represent hydrogen atom, halogen atom or monovalent organic residue; or a substituted or unsubstituted fused ring may be formed by at least one combination of $R_{3-1}$ and $R_{3-2}$, $R_{3-2}$ and $R_{3-3}$, $R_{3-3}$ and $R_{3-4}$, $R_{3-4}$ and $R_{3-5}$, $R_{3-5}$ and $R_{3-6}$, and $R_{3-6}$ and $R_{3-7}$; $A_{3-1}$ represents divalent organic residue; and $Z_{3-1}^{\ominus}$ represents anion residue), wherein the metal chelate compound is at least one compound selected from the compounds (1)-(8) shown below:

(1) thiosalicylaldoxime type compound represented by the following formula:

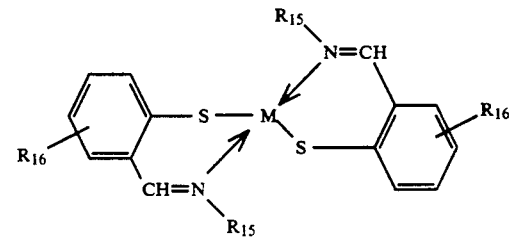

wherein each $R_{15}$ represents hydrogen atom, hydroxyl, alkyl or aryl, and may be also bonded to another $R_{15}$; each $R_{16}$ represents alkyl, halogen atom, hydrogen atom, nitro or benzo-fused type group; and the center metal M represents Cu, Ni, Co or Pd, (2) oxyxanthione type compound:

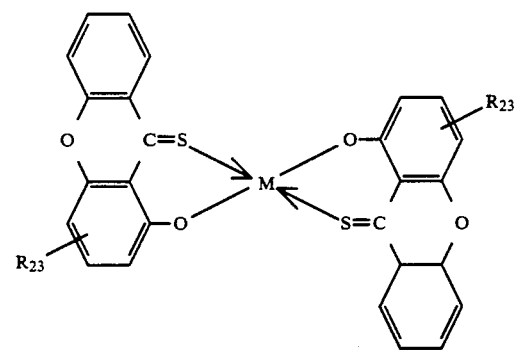

wherein each $R_{23}$ represents hydrogen atom, halogen atom or alkyl; and M represents Cu or Ni, (3) pyromeconic acid type compound:

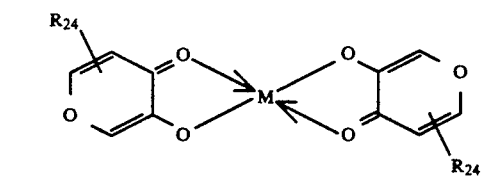

wherein $R_{24}$ represents hydrogen atom or alkyl; and M represents Cu, Ni, Co or Mn, (4) mercaptobenzoazole type compound:

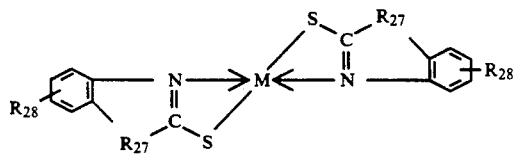

wherein each $R_{27}$ represents sulfur atom, substituted or unsubstituted amino group, oxygen atom or thioketone group; each $R_{28}$ represents hydrogen atom, alkyl, halogen atom or amino group; and M represents Zn, Cu or Ni, (5) hydroxamic acid type compound:

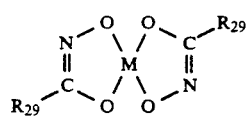

wherein each $R_{29}$ represents alkyl, aryl or styryl; and M represents Cu, Ni or Co, (6) nitrosohydroxylamine type compound:

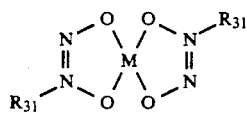

wherein each $R_{31}$ represents alkyl or aryl; and M represents Cu, Ni or Co, (7) dioxime type compound:

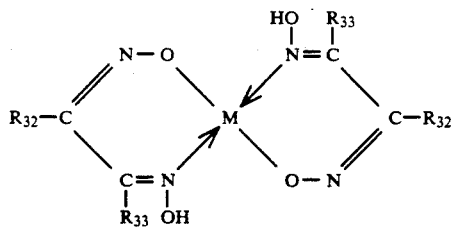

wherein $R_{32}$ and $R_{33}$ each represent alkyl or aryl; and M represents Ni, and (8) anthranilic acid type compound:

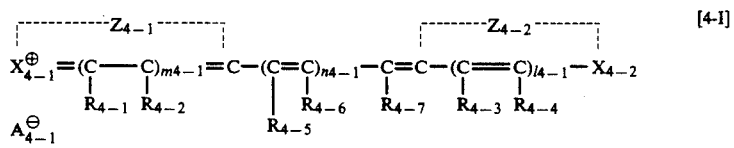

wherein each $R_{41}$ represents hydrogen atom, halogen atom, alkyl, acyl, nitro or alkoxyl; and M represents Zn, Cu, Ni or Co.

2. An optical information recording medium according to claim 1, wherein the pyrylium compound is at least one selected from the compounds of the general formulae (4-I) to (4-IV) shown below:

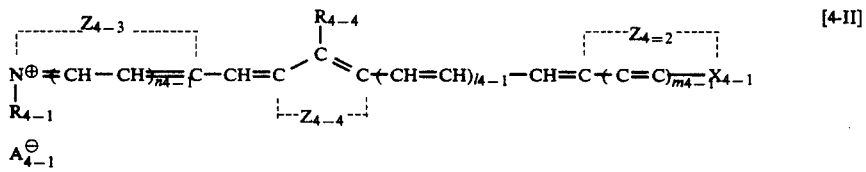

[4-I]

wherein $X_{4-1}$ and $X_{4-2}$ each represent sulfur, oxygen, selenium or tellurium atom;

$Z_{4-1}$ represents a hydrocarbon group comprising a group of atoms necessary for the completion of pyrylium, thiopyrylium, selenapyrylium, tellulopyrylium, benzopyrylium, benzothiopyrylium, benzoselenapyrylium, benzotellulopyrylium, naphthopyrylium, naphthothiopyrylium, naphthoselenapyrylium or naphthotellulopyrylium which may be substituted;

$Z_{4-2}$ represents a hydrocarbon group comprising a group of atoms necessary for the completion of pyran, thiopyran, selenapyran, tellulopyran, benzopyran, benzothiopyran, benzoselenapyran, benzotellulopyran, naphthopyran, naphthothiopyran, naphthoselenapyran or naphthotellulopyran which may be substituted;

$R_{4-1}$, $R_{4-2}$, $R_{4-3}$ and $R_{4-4}$ each represent hydrogen atom, substituted or unsubstituted alkyl, substituted or unsubstituted aryl;

$R_{4-5}$, $R_{4-6}$ and $R_{4-7}$ each represent hydrogen atom, halogen atom, substituted or unsubstituted alkyl, substitued or unsubstituted aryl or substituted or unsubstituted aralkyl;

$m_{4-1}$ and $l_{4-1}$ each represent 1 or 2;

$n_{4-1}$ represents 0; 1, 2 or 3, with proviso that when $n_{4-1}$ is 2 or 3, $R_{4-5}$ may be all the same or different; and $R_{4-6}$ may be all the same or different;

$A_{4-1}^{\ominus}$ represents an anion.

[4-II]

wherein $Z_{4-3}$ represents a group of atoms necessary for the completion of substituted of unsubstituted nitrogen containing heterocyclic group; $Z_{4-2}$ represents a group of atoms necessary for the completion of pyran, thiopyran, selenapyran, tellulopyran, benzopyran, benzothiopyran, benzoselenapyran, benzotellulopyran, naphthopyran, naphtothiopyran, naphthoselenapyran or naphthotellulopyran which may be substituted;

$X_{4-1}$ represents sulfur, oxygen, selenium or tellurium atom; $Z_{4-4}$ represents divalent hydrocarbon group for forming substituted or unsubstituted 5- or 6-membered ring; $R_{4-1}$ represents hydrogen atom or substituted or unsubstituted alkyl; $R_{4-2}$ and $R_{4-3}$ each represent hydrogen atom, halogen atom or monovalent organic residue; $R_{4-4}$ represents hydrogen atom or halogen atom; $A^{\ominus}$ represents an anion; $m_{4-1}$ and $n_{4-1}$ each represent 0 or 1; and $l_{4-1}$ represent 0, 1 or 2,

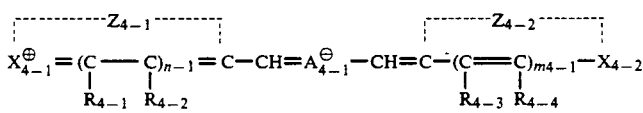

wherein $A_{4-1}^{\ominus}$ represents

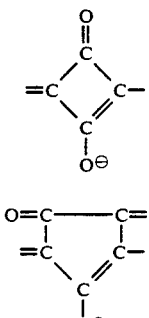

$X_{4-1}$ and $X_{4-2}$ each represent sulfur, selenium or tellurium atom; $Z_{4-1}$ represents a group of atoms necessary for the completion of pyrylium, thiopyrylium, selenapyrylium, tellulopyrylium, benzopyrylium, benzothiopyrylium, benzoselenapyrylium, benzotellulopyrylium, naphthopyrylium, naphthothiopyrylium, naphthoselenapyrylium or naphthotellulopyrylium which may be each substituted. $Z_{4-2}$ represents a group of atoms necessary for the completion of pyran, thiopyran, selenapyran, tellulopyran, benzopyran, benzothiopyran, benzoselenapyran, benzotellulopyran, naphthopyran, naphthothiopyran, naphthoselenapyran or naphthotellulopyran which may be each substituted; $R_{4-1}$, $R_{4-2}$, $R_{4-3}$ and $R_{4-4}$ each represent hydrogen atom, alkyl, alkoxy, substituted or unsubstituted aryl, substituted or unsubstituted styryl, substituted or unsubstituted 4-phenyl-1,3-butadienyl or substituted or unsubstituted heterocyclic group; also $R_{4-1}$ and $R_{4-2}$ may form substituted or unsubstituted benzene ring, or $R_{4-3}$ and $R_{4-4}$ may form substituted or unsubstituted benzene ring; $m_{4-1}$ and $n_{4-1}$ each represent 1 or 2,

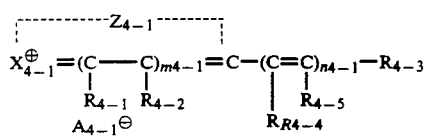

[4-IV]

wherein $X_{4-1}$ represents sulfur, oxygen, selenium or tellurium atom;

[4-III]

$Z_{4-1}$ represents a hydrocarbon group comprising a group of atoms necessary for the completion of pyrylium, thiopyrylium, selenapyrylium tellulopyrylium, benzopyrylium, benzothiopyrylium, benzoselenapyrylium, benzotellulopyrylium, naphthopyrylium, naphthothiopyrylium, naphthoselenapyrylium or ntphthotellulopyrylium which may be each substituted;

$R_{4-1}$ and $R_{4-2}$ each represent hydrogen atom, substituted or unsubstituted alkyl, substituted or unsubstituted aryl or substituted or unsubstituted styryl;

$R_{4-3}$ represents substituted or unsubstituted aryl or substituted or unsubstituted heterocyclic group;

$R_{4-4}$ and $R_{4-5}$ each represent hydrogen atom or alkyl;

$A_{4-1}^{\ominus}$ represents an anion;

$m_{4-1}$ represents 1 or 2;

$n_{4-1}$ represents 0, 1, 2 or 3, with proviso that when $n_{4-1}$ is 2 or 3, $R_{4-4}$ may be all the same or different, and $R_{4-5}$ may be all the same or different.

3. An optical information recording medium according to claim 1, wherein the metal chelate compound is contained in an amount of 1 to 60 wt. % based on the total weight of the recording material for forming a recording layer.

4. An optical information recording medium according to claim 3, wherein the metal chelate compound is contained in an amount of 5 to 60 wt. % based on the total weight of the recording material for forming a recording layer.

5. An optical information recording medium according to any of claims 1, 2, 3 or 4, wherein the optical information recording medium is an optical card.

6. An optical information recording medium according to any of claims 1, 2, 3 or 4, wherein the optical information recording medium is an optical disc.

* * * * *

UNITED STATES PATENT AND TRADEMARK OFFICE
CERTIFICATE OF CORRECTION

PATENT NO. : 5,178,995
DATED : January 12, 1993
INVENTOR(S) : FUKUI ET AL.

It is certified that error appears in the above-identified patent and that said Letters Patent is hereby corrected as shown below:

AT [57] ABSTRACT

Line 4, "compounds" (second occurrence) should read --compound--.

AT [75]

Inventors: "Yoshhiro" should read --Yoshihiro--.

COLUMN 1

Line 18, "with" should read --within--.

Line 19, "small," should read --small space,--.

Line 33, "the laser energy irradiated," should read --irradiated laser energy,--.

Line 41, "card," should read --card, a--.

COLUMN 2

Line 13, "1." should read --1,--.

Line 14, "3., but" should read --3, but--.

Line 19, "absorbance," should read --absorbance and--.

UNITED STATES PATENT AND TRADEMARK OFFICE
CERTIFICATE OF CORRECTION

PATENT NO. : 5,178,995
DATED : January 12, 1993
INVENTOR(S) : FUKUI ET AL.

It is certified that error appears in the above-identified patent and that said Letters Patent is hereby corrected as shown below:

COLUMN 3

Formula (2-I), "$\{C\text{-----}C\}_{n2\text{-}1}$" should read
$$\phantom{--}\begin{array}{cc} | & | \\ R_{2\text{-}4} & R_{2\text{-}5} \end{array}$$

$$-- \{C = C\}_{n2\text{-}1} --$$
$$\phantom{--}\begin{array}{cc} | & | \\ R_{2\text{-}4} & R_{2\text{-}5} \end{array}.$$

Line 24, "$X_{1\text{-}1}^{\ominus}$" should read --$X^{\ominus}_{1\text{-}1}$--.

Line 50, "$X_{2\text{-}1}^{\ominus}$" should read --$X^{\ominus}_{2\text{-}1}$--.

Line 67, "$X_{2\text{-}1}^{\ominus}$" should read --$X^{\ominus}_{2\text{-}1}$--.

UNITED STATES PATENT AND TRADEMARK OFFICE
CERTIFICATE OF CORRECTION

PATENT NO. : 5,178,995
DATED : January 12, 1993
INVENTOR(S) : FUKUI et al

It is certified that error appears in the above-indentified patent and that said Letters Patent is hereby corrected as shown below:

COLUMN 4

Line 4, " ForDm2ulla (2-111)" should read

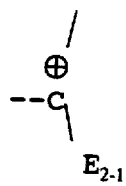

-- Formula (2-111) --

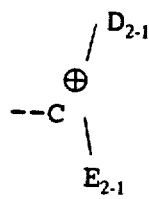

Line 60, "$Z_{2\text{-}1}^{\ominus}$" should read --$Z^{\ominus}_{2\text{-}1}$--.

COLUMN 5

Line 30, "$Z_{2\text{-}1}^{\ominus}$" should read --$Z^{\ominus}_{2\text{-}1}$--.

COLUMN 6

UNITED STATES PATENT AND TRADEMARK OFFICE
CERTIFICATE OF CORRECTION

PATENT NO. : 5,178,995

DATED : January 12, 1993

INVENTOR(S) : FUKUI ET AL.

It is certified that error appears in the above-identified patent and that said Letters Patent is hereby corrected as shown below:

COLUMN 8

Line 66, "$Z_{3-1}{}^{\ominus}$" should read --$Z^{\ominus}_{3-1}$--.

COLUMN 9

Formula (3-5), each of "$R_{3-1}{}'$", "$R_{3-2}{}'$", "$R_{3-3}{}'$", "$R_{3-4}{}'$", "$R_{3-5}{}'$", "$R_{3-5}{}'$", "$R_{3-6}{}'$" and "$R_{3-7}{}'$" should read --$R'_{3-1}$--, --$R'_{3-2}$--, --$R'_{3-3}$--, --$R'_{3-4}$--, --$R'_{3-5}$--, --$R'_{3-5}$--, --$R'_{3-6}$-- and --$R'_{3-7}$--, respectively.

Formula (3-6), "$n_{3-1}$" should read --$m_{3-1}$--.

Line 48, "$Z_{3-1}{}^{\ominus}$" should read --$Z^{\ominus}_{3-1}$--.

COLUMN 10

Line 13, "$Z_{3-1}{}^{\ominus}$" should read --$Z^{\ominus}_{3-1}$--.

Line 27, "$Z_{3-1}{}^{\ominus}$" should read --$Z^{\ominus}_{3-1}$--.

Line 34, "$Z_{3-1}{}^{\ominus}$" should read --$Z^{\ominus}_{3-1}$--.

Line 62, $Z_{3-1}{}^{\ominus}$" should read --$Z^{\ominus}_{3-1}$--.

UNITED STATES PATENT AND TRADEMARK OFFICE
CERTIFICATE OF CORRECTION

PATENT NO. : 5,178,995

DATED : January 12, 1993

INVENTOR(S) : FUKUI ET AL.

It is certified that error appears in the above-identified patent and that said Letters Patent is hereby corrected as shown below:

COLUMN 14

Line 18, "dodecyl" should read --dodecyl;--.

Line 21, "B-naphthyl" should read --β-naphthyl;--.

Line 34, "rings" should read --rings,--.

Line 39, "No." should read --No--.

Formula (4-1), the group "$X_{4-1}$" should read --$X^{\oplus}_{4-1}$--.

Line 61, "$A_{4-1}{}^{\ominus}$" should read --$A^{\ominus}_{4-1}$--.

COLUMN 15

Line 1, before the chemical structure, should read --Formula (4-III)--.

Line 5, the term "$\ell_{4-1}$" in the chemical structure should read --$m_{4-1}$-- and the term "$A^{\ominus}$" should read --$A^{\ominus}_{4-1}$--.

Line 10, "$A_{4-1}{}^{\ominus}$" should read --$A^{\ominus}_{4-1}$--.

Line 37, "naphthosele-napyran" should read --naphthoselenapyran--.

COLUMN 16

Line 19, "ring." should read --ring;--.

Line 67, "benzylaminophenyl" should read --benzylaminophenyl;--.

UNITED STATES PATENT AND TRADEMARK OFFICE
CERTIFICATE OF CORRECTION

PATENT NO. : 5,178,995
DATED : January 12, 1993
INVENTOR(S) : FUKUI ET AL.

It is certified that error appears in the above-identified patent and that said Letters Patent is hereby corrected as shown below:

COLUMN 17

Line 6, "phenylaminostyryl;" should read --phenylaminostyryl.--.

COLUMN 86

Line 35, "$X_{1-1}^{\ominus}$" should read --$X^{\ominus}_{1-1}$--.

Line 49, "$X_{2-1}^{\ominus}$" should read --$X^{\ominus}_{2-1}$--.

Line 66, "$X_{2-1}^{\ominus}$" should read --$X^{\ominus}_{2-1}$--.

COLUMN 87

Line 6, "$Z_{2-1}^{\ominus}$" should read --$Z^{\ominus}_{2-1}$--.

Line 67, "general formulae, and," should read --general formulae [3-I], [3-II] and [3-III],--.

COLUMN 88

Line 7, "$Z_{3-1}^{\ominus}$" should read --$Z^{\ominus}_{3-1}$--.

UNITED STATES PATENT AND TRADEMARK OFFICE
CERTIFICATE OF CORRECTION

PATENT NO. : 5,178,995

DATED : January 12, 1993

INVENTOR(S) : FUKUI ET AL.

It is certified that error appears in the above-identified patent and that said Letters Patent is hereby corrected as shown below:

COLUMN 90

Line 29, "lulopyrylium," should read --luropyrylium,--.

Line 30, "benzotellulopyrylium," should read --benzotelluropyrylium,--.

Line 32, "naphtotellulopyrylium" should read --naphthotelluropyrylium--.

Line 36, "tellulopyran," should read --telluropyran,--.

Line 38, "zotellulopyran," should read --zotelluropyran,--.

Line 39, "naphthotellulopyran" should read --naphthotelluropyran--.

Line 52, "$A_{4-1}{}^{\ominus}$" should read --$A^{\ominus}{}_{4-1}$--.

Line 67, "lulopyran," should read --luropyran,--.

Line 68, "benzotellulopyran," should read --benzotelluropyran,--.

COLUMN 91

Line 1, "naphtothiopyran," should read --naphthothiopyran,--.

Line 2, "thotellulopyran" should read --thotelluropyran--.

UNITED STATES PATENT AND TRADEMARK OFFICE
CERTIFICATE OF CORRECTION

PATENT NO. : 5,178,995
DATED : January 12, 1993
INVENTOR(S) : FUKUI ET AL.

It is certified that error appears in the above-identified patent and that said Letters Patent is hereby corrected as shown below:

COLUMN 91

Line 19, "$A_{4-1}{}^{\ominus}$" should read --$A^{\ominus}_{4-1}$--.

Line 38, "tellulopyrylium," should read --telluropyrylium,--.

Line 40, "benzotellulopyrylium," should read --benzotelluropyrylium,--.

Line 42, "naphtotellulopyrylium" should read --naphthotelluropyrylium--.

Line 45, "tellulopyran," should read --telluropyran,--.

Line 47, "zotellulopyran," should read --zotelluropyran,--.

Line 48, "naphthotellulopyran" should read --naphthotelluropyran--.

COLUMN 92

Line 5, Formula [4-IV], the group "$R_{R4-4}$" should read --$R_{4-4}$--.

Line 23, "lulopyrylium," should read --luropyrylium,--.

Line 24, "benzotellulopyrylium," should read --benzotelluropyrylium,--.

UNITED STATES PATENT AND TRADEMARK OFFICE
CERTIFICATE OF CORRECTION

PATENT NO. : 5,178,995
DATED : January 12, 1993
INVENTOR(S) : FUKUI ET AL.

It is certified that error appears in the above-identified patent and that said Letters Patent is hereby corrected as shown below:

<u>COLUMN 92</u>

Line 26, "ntphthotellulopyrylium" should read --naphthotelluropyrylium--.

Line 35, "$A_{4\text{-}1}^{\ominus}$" should read --$A^{\ominus}_{4\text{-}1}$--.

Signed and Sealed this

Twelfth Day of April, 1994

Attest:

BRUCE LEHMAN

*Attesting Officer*   *Commissioner of Patents and Trademarks*